US010525597B2

(12) United States Patent
Harada et al.

(10) Patent No.: US 10,525,597 B2
(45) Date of Patent: Jan. 7, 2020

(54) ROBOT AND ROBOT SYSTEM

(71) Applicant: Seiko Epson Corporation, Tokyo (JP)

(72) Inventors: Atsushi Harada, Matsumoto (JP);
Yukihiro Yamaguchi, Matsumoto (JP);
Taro Ishige, Matsumoto (JP); Koichi Yasuda, Chino (JP); Kazushige Akaha, Azumino (JP)

(73) Assignee: Seiko Epson Corporation (JP)

( * ) Notice: Subject to any disclaimer, the term of this patent is extended or adjusted under 35 U.S.C. 154(b) by 186 days.

(21) Appl. No.: 15/514,666

(22) PCT Filed: Nov. 13, 2015

(86) PCT No.: PCT/JP2015/005678
§ 371 (c)(1),
(2) Date: Mar. 27, 2017

(87) PCT Pub. No.: WO2016/079967
PCT Pub. Date: May 26, 2016

(65) Prior Publication Data
US 2018/0243911 A1     Aug. 30, 2018

(30) Foreign Application Priority Data

Nov. 21, 2014   (JP) .................................. 2014-236299
Mar. 30, 2015   (JP) .................................. 2015-068272

(51) Int. Cl.
*G05B 19/04*     (2006.01)
*G05B 19/18*     (2006.01)
*B25J 9/16*      (2006.01)

(52) U.S. Cl.
CPC ........... *B25J 9/1692* (2013.01); *B25J 9/1697* (2013.01); *G05B 2219/39008* (2013.01);
(Continued)

(58) Field of Classification Search
CPC ................. B25J 9/1692; B25J 9/1697; G05B 2219/39008; G05B 2219/39022;
(Continued)

(56) References Cited

U.S. PATENT DOCUMENTS 5,297,238 A * 3/1994 Wang .................... B25J 9/1692
                                                         700/254
5,329,469 A * 7/1994 Watanabe .............. B25J 9/1697
                                                          348/95
(Continued)

FOREIGN PATENT DOCUMENTS

JP          08-210816 A    8/1996
WO     WO-2014-161603 A1   10/2014

OTHER PUBLICATIONS

Extended European Search Report for Application No. EP 15 86 1922 dated Apr. 24, 2018 (9 pages).

*Primary Examiner* — Harry Y Oh
(74) *Attorney, Agent, or Firm* — Harness, Dickey & Pierce, P.L.C.

(57) ABSTRACT

A robot includes an instruction receiving unit that receives a calibration initiation instruction, and an arm that changes a positional relationship between a marker which indicates a reference point and a capturing unit when the calibration initiation instruction is received, in which the calibration of a coordinate system of the capturing unit and a coordinate system of the robot is performed on the basis of an image in which the marker is captured by the capturing unit after the positional relationship between the capturing unit and the marker changes.

15 Claims, 21 Drawing Sheets

(52) U.S. Cl.
CPC ........... *G05B 2219/39022* (2013.01); *G05B 2219/39045* (2013.01); *G05B 2219/39057* (2013.01); *Y10S 901/09* (2013.01); *Y10S 901/47* (2013.01)

(58) Field of Classification Search
CPC ........... G05B 2219/39045; G05B 2219/39057; Y10S 901/09; Y10S 901/47
See application file for complete search history.

(56) References Cited

U.S. PATENT DOCUMENTS

| | | | | |
|---|---|---|---|---|
| 9,043,024 | B2* | 5/2015 | Chiu | B25J 9/1692 318/568.22 |
| 9,193,073 | B1* | 11/2015 | Huang | B25J 9/1692 |
| 2008/0188983 | A1* | 8/2008 | Ban | B25J 9/1692 700/245 |
| 2011/0280472 | A1* | 11/2011 | Wallack | B25J 9/1692 382/153 |
| 2012/0098958 | A1* | 4/2012 | Metzler | B25J 9/1697 348/95 |
| 2012/0300058 | A1 | 11/2012 | Li et al. | |
| 2013/0010081 | A1* | 1/2013 | Tenney | A61B 34/30 348/47 |
| 2014/0100694 | A1* | 4/2014 | Rueckl | B25J 9/1692 700/254 |
| 2014/0229005 | A1* | 8/2014 | Suzuki | B25J 9/1692 700/254 |
| 2014/0288710 | A1 | 9/2014 | Ikenaga et al. | |
| 2015/0025683 | A1* | 1/2015 | Amano | B25J 9/1692 700/254 |
| 2015/0088311 | A1* | 3/2015 | Suzuki | B25J 9/1697 700/254 |
| 2016/0059419 | A1* | 3/2016 | Suzuki | B25J 9/1697 700/114 |

* cited by examiner

ROBOT AND ROBOT SYSTEM

This application is a U.S. National Phase Application of International Application No. PCT/JP2015/005678, filed on Nov. 13, 2015 and published in English as WO 2016/079967 A1 on May 26, 2016, which claims priority to Japanese Patent Application No. 2014-236299, filed on Nov. 21, 2014 and No. 2015-068272, filed on Mar. 30, 2015. The entire disclosures of the above referenced applications are expressly incorporated by reference herein.

TECHNICAL FIELD

The present invention relates to a robot and a robot system.

BACKGROUND ART

In the related art, controlling a robot with robot vision has required a process of calibrating a robot coordinate system and a coordinate system of a capturing unit. During calibration, the position of a reference point in a space where a robot is installed is specified in each of the robot coordinate system and the coordinate system of the capturing unit, and a matrix for transforming the position of the reference point represented in one coordinate system into the position of the reference point represented in the other coordinate system is obtained. According to the technology disclosed in JP-A-8-210816, calibration is performed by teaching reference points in the robot coordinate system by moving an arm to touch three reference points and then by capturing markers that indicate the reference points with the capturing unit that is moved by the arm to a predetermined position and by detecting the reference points in the coordinate system of the capturing unit.

According to the technology disclosed in JP-A-8-210816, teaching the positions of the reference points is required by an operation of the arm by an operator to touch the three reference points. However, it is not easy to accurately operate the arm while visually specifying whether the arm touches the reference points or not. That is, the technology disclosed in JP-A-8-210816 has a problem in that it is not easy to accurately teach the positions of the reference points. Another problem arises in that a necessary time required for calibration is prolonged when calibration is performed with accurate teaching of the positions of the plurality of reference points. As the number of calibration target robots increases, this problem becomes worse.

SUMMARY

An advantage of some aspects of the invention is to facilitate the calibration of a coordinate system of a capturing unit and a coordinate system of a robot.

A robot according to an aspect of the invention includes an instruction receiving unit that receives a calibration initiation instruction, and an arm that changes a positional relationship between a marker which indicates a reference point and a capturing unit when the calibration initiation instruction is received, in which the calibration of a coordinate system of the capturing unit and a coordinate system of the robot is performed on the basis of an image in which the marker is captured by the capturing unit after the positional relationship between the capturing unit and the marker changes.

A robot according to another aspect of the invention includes an arm that automatically changes a positional relationship between a marker which indicates three or more reference points and a capturing unit to at least one of a first state where a plane which includes the three or more reference points is perpendicular to an optical axis of the capturing unit, a second state where the capturing unit focuses on the marker which indicates at least one of the three or more reference points, a third state where the optical axis of the capturing unit passes through a first point on the plane, a fourth state where the optical axis of the capturing unit passes through a second point on the plane, and a fifth state where the optical axis of the capturing unit passes through a third point on the plane, in which the calibration of a coordinate system of the capturing unit and a coordinate system of the robot is performed on the basis of an image in which the marker is captured by the capturing unit in the third state, the fourth state, and the fifth state.

According to these aspects of the invention, the calibration initiation instruction can change the positional relationship between the capturing unit and the marker to a state where an image necessary for calibrating the coordinate system of the capturing unit and the coordinate system of the robot can be captured. Therefore, the calibration of the coordinate system of the capturing unit and the coordinate system of the robot is facilitated.

It is sufficient that the calibration initiation instruction is an instruction that specifies a timing of initiating the arm to perform an operation of changing the positional relationship between the capturing unit and the marker to a state where an image necessary for calibrating the coordinate system of the capturing unit and the coordinate system of the robot can be captured. The calibration initiation instruction may not include a target value that specifies the amount of change of the position or attitude of the arm. It is sufficient that the marker is a marker that indicates the reference point in the robot coordinate system. For example, a two-dimensional figure such as a point or a circle written on a flat plate can be used as a marker. An object having a three-dimensional shape (for example, a tip end portion of the arm) can also be used as a marker. The marker may be disposed in the arm or may be disposed in an object (for example, a workbench) that is fixed in a space where the robot is installed. When the marker is disposed in the arm (includes a case where the arm is the marker), the capturing unit is fixed in the robot coordinate system. When the marker is fixed in the robot coordinate system, the capturing unit is disposed in the arm.

Functions of each unit disclosed in the aspects of the invention are implemented by hardware resources that have functions specified by configurations thereof, hardware resources that have functions specified by programs, or combinations thereof. The functions of each unit are not limited to being implemented by hardware resources that are physically independent of each other.

A robot according to still another aspect of the invention includes an instruction receiving unit that receives a calibration initiation instruction, and an arm that is capable of mounting of a tool in which a marker which indicates a reference point is disposed and that changes a positional relationship between the marker and a capturing unit when the calibration initiation instruction is received, in which the marker is disposed on a face of the tool that faces the arm, and the calibration of a coordinate system of the capturing unit and a coordinate system of the robot is performed on the basis of an image in which the marker is captured by the capturing unit after the positional relationship between the capturing unit and the marker changes.

A robot according to yet another aspect of the invention includes an arm that is capable of mounting of a tool in which a marker which indicates three or more reference points is disposed and that automatically changes a positional relationship between the marker and a capturing unit to at least one of a first state where a plane which includes the three or more reference points is perpendicular to an optical axis of the capturing unit, a second state where the capturing unit focuses on the marker which indicates at least one of the three or more reference points, a third state where the optical axis of the capturing unit passes through a first point on the plane, a fourth state where the optical axis of the capturing unit passes through a second point on the plane, and a fifth state where the optical axis of the capturing unit passes through a third point on the plane, in which the marker is disposed on a face of the tool that faces the arm, and the calibration of a coordinate system of the capturing unit and a coordinate system of the robot is performed on the basis of an image in which the marker is captured by the capturing unit in the third state, the fourth state, and the fifth state.

According to these aspects of the invention, the calibration initiation instruction can change the positional relationship between the capturing unit and the marker to a state where an image necessary for calibrating the coordinate system of the capturing unit and the coordinate system of the robot can be captured. Therefore, the calibration of the coordinate system of the capturing unit and the coordinate system of the robot is facilitated.

In the robot, the arm may change the positional relationship to a predetermined state when the calibration initiation instruction is received, and the calibration may be performed on the basis of the image in which the marker is captured by the capturing unit when the positional relationship is in the predetermined state.

In the robot, the arm may obtain a target value that is deduced on the basis of the image in which the marker is captured by the capturing unit and change the positional relationship to the predetermined state on the basis of the target value.

In the robot, the calibration initiation instruction may not include a target value that is used to change the positional relationship to the predetermined state.

In the robot, the predetermined state may include a state where the capturing unit focuses on the marker.

In the robot, the arm, when the calibration initiation instruction is received, may obtain a target value that is deduced on the basis of a partial image which is clipped out of the image in which the marker is captured by the capturing unit and change the positional relationship to a state where the capturing unit focuses on the marker on the basis of the target value.

In the robot, the arm may cause the capturing unit to focus on the marker by changing the positional relationship between the capturing unit and the marker in a first direction that is perpendicular to a plane which includes three or more reference points and then by changing the positional relationship between the capturing unit and the marker in a second direction that is opposite to the first direction.

In the robot, the predetermined state may include a state where a plane that includes three or more reference points is perpendicular to an optical axis of the capturing unit.

In the robot, the predetermined state may include three or more states that have different positions at which the optical axis of the capturing unit passes through the plane.

In the robot, the capturing unit may be disposed in the arm.

In the robot, the capturing unit may be disposed to be capable of capturing the arm from above the arm in the direction of gravity.

In the robot, the capturing unit may be disposed to be capable of capturing the arm from below the arm in the direction of gravity.

A robot system according to still yet another aspect of the invention includes a robot that includes an instruction receiving unit which receives a calibration initiation instruction, and an arm which changes a positional relationship between a marker which indicates a reference point and a capturing unit when the calibration initiation instruction is received; and a calibrating device that performs the calibration of a coordinate system of the capturing unit and a coordinate system of the robot on the basis of an image in which the marker is captured by the capturing unit after the positional relationship between the capturing unit and the marker changes, in which the capturing unit is disposed at a point that is fixed in a coordinate system in which the arm moves when the position of the marker is fixed with respect to the arm, and the capturing unit is disposed at a point that is fixed with respect to the arm when the position of the marker is fixed with respect to the coordinate system in which the arm moves.

In the robot, the arm may automatically change the positional relationship to the first state, the second state, the third state, the fourth state, and the fifth state.

In the robot, the arm may obtain a target value that is deduced on the basis of an image in which the marker is captured by the capturing unit and automatically change the positional relationship on the basis of the target value.

DESCRIPTION OF EMBODIMENTS

Hereinafter, embodiments of the invention will be described with reference to the attached drawings. Corresponding constituents in each drawing are designated by the same reference sign, and duplicate descriptions thereof will not be provided.

1. First Embodiment 1-1. Summary

Figure 1A:
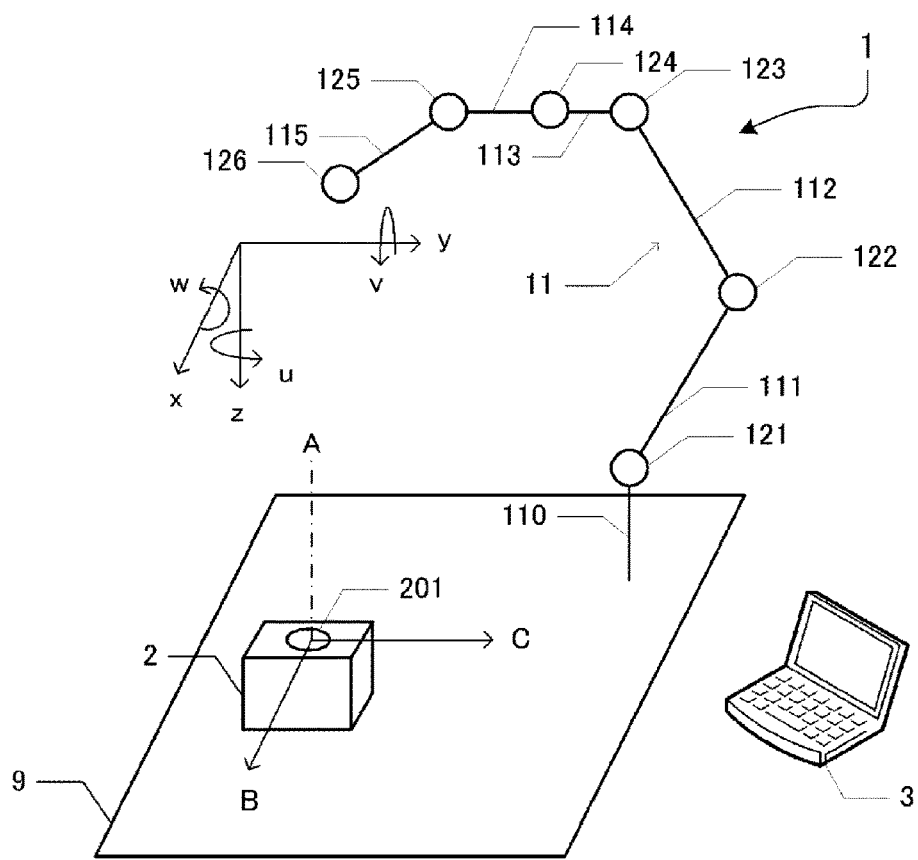
FIG. 1A is a schematic perspective view according to an embodiment of the invention.
Figure 1B:
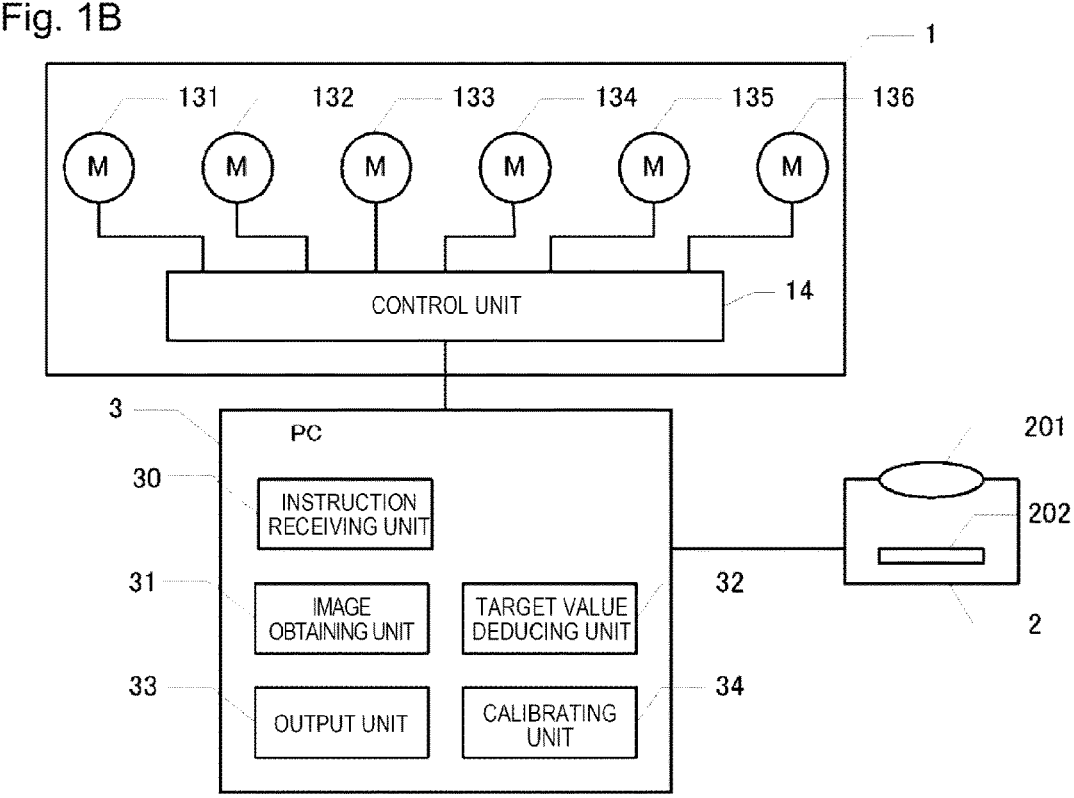
FIG. 1B is a block diagram according to the embodiment of the invention.

A robot system as the present embodiment of the invention is provided with a robot 1, a capturing unit 2, and a personal computer (PC) 3 as a calibrating device as illustrated in FIGS. 1A and 1B.

The robot 1 is a six-axis robot that is provided with six rotary shaft members 121, 122, 123, 124, 125, and 126 in an arm thereof. The center of the tip end of the rotary shaft member 126 on which various types of tools for operating a work are mounted is referred to as a tool center point (TCP). The position and attitude of the TCP serve as reference for the positions and attitudes of various types of tools. A coordinate system of the robot 1 that is used when the robot 1 is controlled is a three-dimensional orthogonal coordinate system that is defined by an x axis and a y axis, each of which is horizontal, and a z axis of which the positive direction is set to a vertical downward direction. Rotation around the z axis is represented by u, rotation around the y axis by v, and rotation around the x axis by w. The unit of length is millimeters, and the unit of angle is degrees in the robot coordinate system.

The capturing unit 2 is a capturing unit for recognizing the size, shape, and position of a work in a reference plane that is perpendicular to the optical axis of a lens 201. A coordinate system of the capturing unit 2 is a coordinate system of an image that is output from the capturing unit 2 and is defined by a B axis and a C axis, the B axis of which the positive direction is set to a horizontal right direction of an image, and the C axis of which the positive direction is set to a vertical downward direction of the image. The unit of length is pixels, and the unit of angle is degrees in the coordinate system of the capturing unit 2. The coordinate system of the capturing unit 2 is a two-dimensional orthogonal coordinate system into which a coordinate system of a plane in a real-world space perpendicular to the optical axis of the capturing unit 2 is non-linearly transformed according to optical characteristics (focal length, distortion, and the like) of the lens 201 and the number and size of pixels of an area image sensor 202. Therefore, a process of correlating the coordinate system of the capturing unit 2 with the coordinate system of the robot 1, that is, calibration is required to recognize the size, shape, and position of a work on the basis of the image that the capturing unit 2 outputs and to control the robot 1 on the basis of the recognition result.

The PC 3 is connected to the robot 1 and the capturing unit 2. A calibration program for calibrating the coordinate system of the robot 1 and the coordinate system of the capturing unit 2 is installed on the PC 3. An operator launches the calibration program so as to perform calibration and inputs a calibration initiation instruction into the PC 3. The calibration initiation instruction is a simple trigger for the calibration program to initiate a calibration process and does not include a target value for operating the robot 1. In order to calibrate the coordinate system of the capturing unit 2, according to the related art, elaborate preparations such as setting the optical axis of the capturing unit 2 to be exactly perpendicular to a plane that includes three or more reference points or teaching three or more reference points accurately by touching the points with the TCP are required. Calibration fails when these preparations are made inaccurately, and the operator can find that preparations are inaccurate by becoming aware of a calibration failure. Therefore, a large amount of time is required for calibration in the related art.

According to the embodiment of the invention described below, preparation for calibration is automatically performed by using robot vision (the image captured by the capturing unit 2) in a state where calibration is not performed. The automatically performed preparation for calibration includes an operation of setting the optical axis of the capturing unit 2 to be perpendicular to the reference plane that includes three or more reference points and of causing the capturing unit 2 to focus on the reference plane. Thus, by only inputting the calibration initiation instruction in a state where an accurate positional relationship between the reference points and the capturing unit is not defined, the coordinate system of the robot 1 and the coordinate system of the capturing unit 2 can be calibrated very easily.

1-2. Configuration

Figure 2:
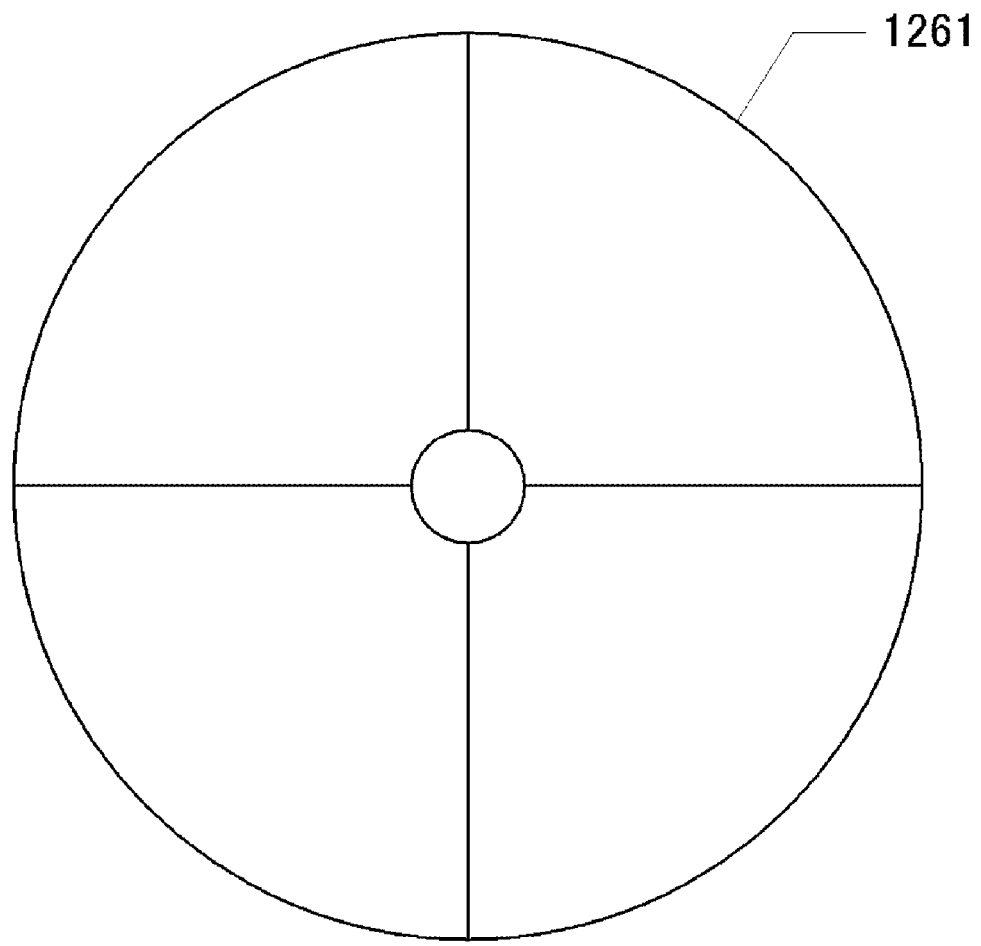
FIG. 2 is a plan view according to the embodiment of the invention.

The robot 1, as simply illustrated in FIG. 1A, is provided with a base table 110 and arms 111, 112, 113, 114, and 115. The base table 110 supports the rotary shaft member 121 of the first arm 111. The first arm 111 rotates along with the rotary shaft member 121 around the center axis of the rotary shaft member 121 with respect to the base table 110. The first arm 111 supports the rotary shaft member 122 of the second arm 112. The second arm 112 rotates along with the rotary shaft member 122 around the center axis of the rotary shaft member 122 with respect to the first arm 111. The second arm 112 supports the rotary shaft member 123 of the third arm 113. The third arm 113 rotates along with the rotary shaft member 123 around the center axis of the rotary shaft member 123 with respect to the second arm 112. The third arm 113 supports the rotary shaft member 124 of the fourth arm 114. The fourth arm 114 rotates along with the rotary shaft member 124 around the center axis of the rotary shaft member 124 with respect to the third arm 113. The fourth arm 114 supports the rotary shaft member 125 of the fifth arm 115. The fifth arm 115 rotates along with the rotary shaft member 125 around the center axis of the rotary shaft member 125 with respect to the fourth arm 114. The fifth arm 115 supports the rotary shaft member 126. A tool chuck 1261 of which a tool installation face is illustrated in FIG. 2 is disposed in the rotary shaft member 126 that is the tip end of a manipulator. Various types of tools for operating a work are installed in the tool chuck 1261. As illustrated in FIG. 2, the installation face of the tool chuck 1261 is divided into four sections, and the shaft of a tool is inserted into the central portion of the tool chuck 1261. The center of the installation face of the tool chuck 1261 corresponds to the TCP.

The robot 1, as illustrated in FIG. 1B, is provided with a motor 131 that drives the rotary shaft member 121, a motor 132 that drives the rotary shaft member 122, a motor 133 that drives the rotary shaft member 123, a motor 134 that drives the rotary shaft member 124, a motor 135 that drives the rotary shaft member 125, a motor 136 that drives the rotary shaft member 126, and a control unit 14 that controls the motors 131 to 136. The motors 131 to 136 are constituents of the arms 111 to 115. The motors 131 to 136 are servo motors that are controlled by feedback such that the difference between a target value and a current value is zero. The control unit 14 obtains a target value that indicates the position and attitude of the TCP from the PC 3 and deduces target values of the motors 131 to 136 on the basis of the target value that indicates the position and attitude of the TCP.

The capturing unit 2 is a digital capturing unit that is provided with the lens 201, the area image sensor 202, an unillustrated AD converter, and the like. The capturing unit 2, as illustrated in FIG. 1A, is disposed at a predetermined position on a table (workbench) 9 on which a work is mounted such that the capturing unit 2 can capture an image in a vertical upward direction. The robot vision that is calibrated in the present embodiment is two-dimensional robot vision that targets the predetermined reference plane. Thus, a single focal lens having a shallow depth of field (short focal length) and a small F value is preferably used as the lens 201.

The PC 3 is a computer that is provided with an unillustrated processor, an unillustrated main storage that is configured of a DRAM, an unillustrated input-output mechanism, an unillustrated external storage that is configured of a non-volatile memory, a display, a keyboard that functions as an instruction receiving unit 30, and the like. The PC 3 functions as the instruction receiving unit 30, an image obtaining unit 31, a target value deducing unit 32, an output unit 33, and a calibrating unit 34 by executing the calibration program stored on the external storage with the processor.

Figure 3:
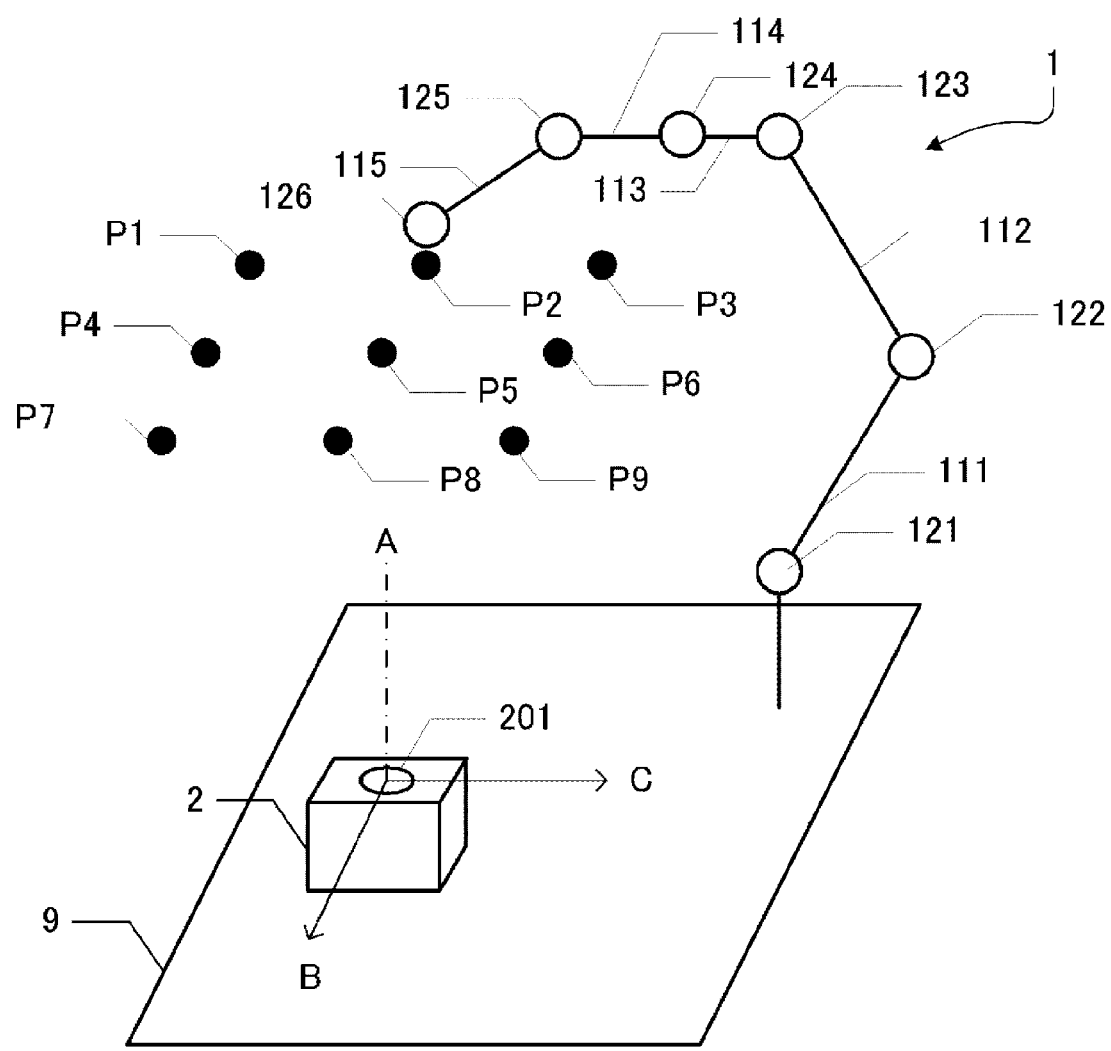
FIG. 3 is a schematic perspective view according to the embodiment of the invention.

The image obtaining unit 31 instructs the capturing unit 2 to capture an image and obtains the image in which a marker indicating the reference point is captured according to the instruction from the capturing unit 2. The reference points used in the present embodiment are nine lattice points P1, P2, P3, P4, P5, P6, P7, P8, and P9 on a plane that is perpendicular to the rotary shaft member 126 in arbitrary positions and attitudes as illustrated in FIG. 3. The plane that includes the reference points P1 to P9 defined with respect to the rotary shaft member 126 in arbitrary positions and attitudes in the present embodiment is referred to as the reference plane. The relative positional relationship between the reference points P1 to P9 is fixed in the robot coordinate system. However, the reference points P1 to P9 move within the fixed vision of the capturing unit 2 when the rotary shaft member 126 moves during the automatic calibration. That is, during the calibration, an X axis and a Y axis that define the reference plane according to the position and attitude (x, y, z, u, v, w) of the rotary shaft member 126 are defined, and the coordinates of the reference points are defined by an X-axis coordinate and a Y-axis coordinate. The X axis and the Y axis are perpendicular to the center axis of the rotary shaft member 126 and are perpendicular to each other. The TCP is set as the origin of the reference plane when the reference plane is defined. The reference plane when the calibration is completed is the target of the robot vision. Since the reference plane is a coordinate system that is fixed to the rotary shaft member 126, the relationship between the coordinate system of the reference plane and the robot coordinate system is linear. In the present embodiment, the installation face of the tool chuck 1261 illustrated in FIG. 2 is used as the marker that indicates the reference points P1 to P9.

The target value deducing unit 32 retains the template of the installation face of the tool chuck 1261. The template of the installation face of the tool chuck 1261 is used to detect the coordinates of the reference points in the coordinate system of the capturing unit 2 by analyzing the image obtained from the capturing unit 2. The target value deducing unit 32 deduces the target values for changing the positional relationship between the capturing unit 2 and the reference points P1 to P9 to predetermined states on the basis of the image that the capturing unit 2 captures. Specifically, the target value deducing unit 32 deduces the positions and attitudes of the reference points P1 to P9 that correspond to predetermined states, as the target values of the TCP, on the basis of the image that the capturing unit 2 captures. The predetermined states are as follows.

xPerpendicular state: a state where the reference plane is perpendicular to the optical axis of the capturing unit 2 xFocusing state: a state where the capturing unit 2 focuses on the reference plane The perpendicular state includes a low-accuracy perpendicular state and a high-accuracy perpendicular state. The low-accuracy perpendicular state is defined by the target values that are deduced on the basis of an image which is captured in a state where the capturing unit 2 does not focus on the reference plane. The high-accuracy perpendicular state is defined by a threshold of a below-described "inclination index". The focusing state is defined by the sharpness of an image that is an index of focusing. In the present embodiment, a state where the sharpness of a predetermined region (partial image) of an image is maximized is set to the focusing state. However, the focusing state may have a range by disposing a threshold to the index of focusing.

The output unit 33 changes the positional relationship between the capturing unit 2 and the reference points P1 to P9 to the perpendicular state and the focusing state by outputting the target values deduced by the target value deducing unit 32 to the control unit 14 of the robot 1.

1-3. Automatic Calibration 1-3-1. Overall Flow

Figure 4:
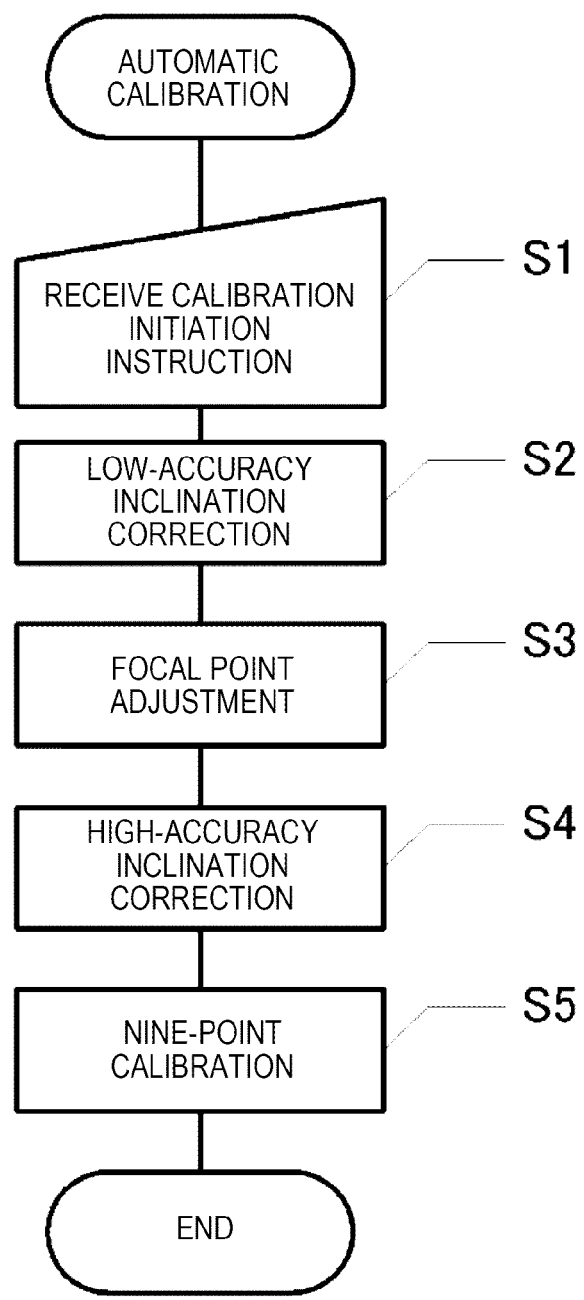
FIG. 4 is a flowchart according to the embodiment of the invention.

Next, the overall flow of the automatic calibration that uses the above robot system will be described with reference to FIG. 4.

The automatic calibration performed by the robot system is launched when the operator inputs the calibration initiation instruction into the PC 3 and is completed without requiring any operation of the operator afterward. What the operator is required to do before the calibration initiation instruction is input are simply an operation of inputting environment information of the robot system into the PC 3 and moving the TCP by a so-called jog feed to a state where the optical axis of the capturing unit 2 approximately passes through the rotary shaft member 126 at the tip end of the manipulator. That is, the operator does not need to perform any elaborate operation before inputting the calibration initiation instruction. The environment information includes the number and size of pixels of the area image sensor 202 and the focal length of the lens 201. Although the installation face of the tool chuck 1261 is used as the marker that indicates the reference points in the present embodiment, the input of the position and attitude of the marker relative to the TCP is required when a plate or the like on which the marker indicating the reference points is represented is mounted on the tool chuck 1261.

When the calibration initiation instruction is input into the PC 3 (step S1), the PC 3 performs low-accuracy inclination correction (step S2). In the low-accuracy inclination correction, the reference plane that corresponds to the position and attitude of the TCP at the time of the input of the calibration initiation instruction is set. Next, an image is captured by the capturing unit 2 when the TCP is positioned at the nine reference points on the reference plane that is set, and the positions of the TCP that indicate the nine reference points are detected in the coordinate system of the capturing unit 2. Then, on the basis of the detection result, target values for setting the reference plane to be perpendicular to the optical axis of the capturing unit 2 (perpendicular state) are deduced. The target values deduced are input into the robot 1. When the arms 111 to 115 move on the basis of the target values, the reference plane becomes approximately perpendicular to the optical axis of the capturing unit 2, which is the low-accuracy perpendicular state.

Next, the PC 3 performs focal point adjustment (step S3). In the focal point adjustment, an image is captured by the capturing unit 2 while the TCP is moved in a direction perpendicular to the reference plane in the low-accuracy perpendicular state, and the focusing state where the sharpness of the tool chuck 1261 captured in the image is maximized is searched. Next, target values for the focusing state are deduced on the basis of the search result. The target values deduced are input into the robot 1. When the arms 111 to 115 move on the basis of the target values, this brings the focusing state about.

Next, the PC 3 performs high-accuracy inclination correction (step S4). In the high-accuracy inclination correction, an image is captured by the capturing unit 2 while the reference plane in the low-accuracy perpendicular state and in the focusing state is inclined at minute angles. The inclination index of the reference plane is deduced on the basis of a plurality of images in which the tool chuck 1261 is captured as the marker that indicates the plurality of reference points in the same reference plane. The inclination index of the reference plane is a value that has a positive correlation with the difference between the angle formed by the optical axis of the capturing unit 2 and the reference plane and 90 degrees. Target values for the perpendicular state are deduced on the basis of the inclination index deduced. The target values deduced are input into the robot 1. When the arms 111 to 115 move on the basis of the target values, this brings the high-accuracy perpendicular state about.

Next, the PC 3 performs nine-point calibration (step S5). In the nine-point calibration, a final transformation equation for calibrating the robot coordinate system and the coordinate system of the capturing unit 2 is deduced on the basis of the coordinates of the nine reference points, which belong to the reference plane in the high-accuracy perpendicular state, in the coordinate system of the reference plane and in the coordinate system of the capturing unit 2.

As described in Summary herebefore, the PC 3 as a calibrating device automatically controls the robot 1 and sets the reference plane which is the target of the robot vision such that the reference plane is perpendicular to the optical axis of the capturing unit 2 and that the capturing unit 2 focuses on the reference plane by performing the low-accuracy inclination correction, the focal point adjustment, and the high-accuracy inclination correction in order. Then, the PC 3 performs the nine-point calibration on the reference plane that is set.

1-3-2. Low-Accuracy Inclination Correction

Figure 5:
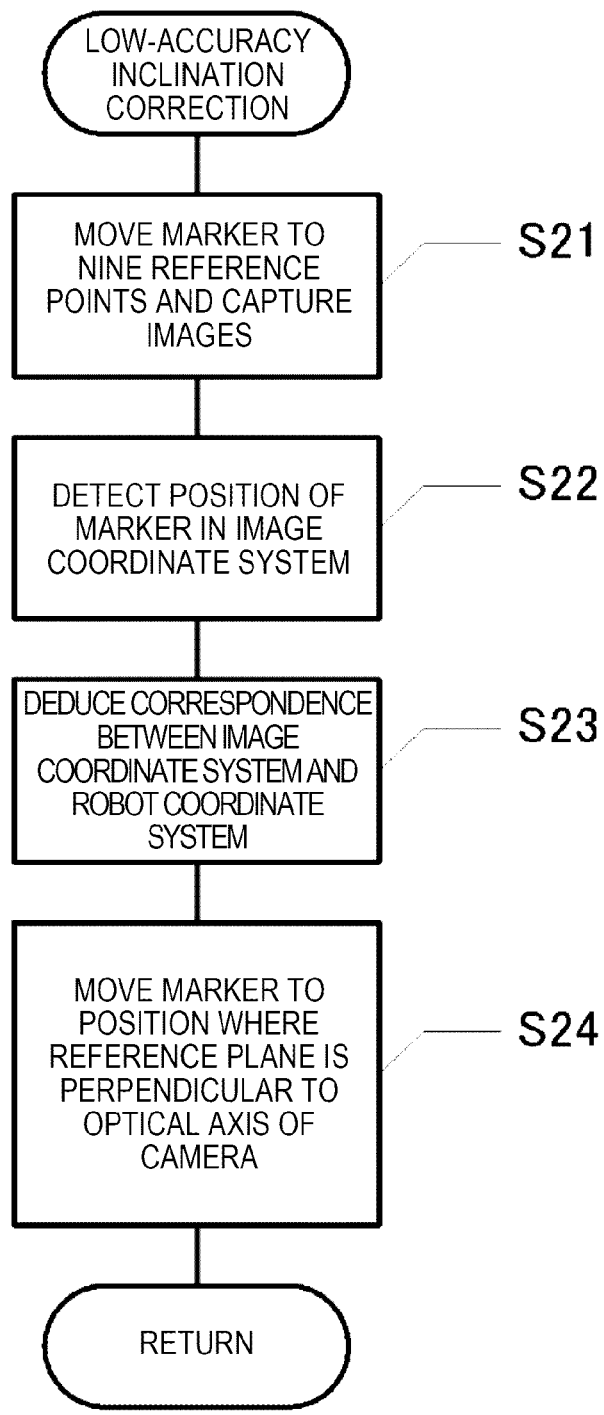
FIG. 5 is a flowchart according to the embodiment of the invention.

Next, the low-accuracy inclination correction will be described in detail with reference to FIG. 5.

First, the target value deducing unit 32 sets the reference plane and deduces target values for moving the TCP as a marker to the nine reference points that belong to the reference plane which is set. Next, the output unit 33 outputs the target values to the control unit 14 of the robot 1, and the image obtaining unit 31 obtains nine images that are captured when the TCP is positioned at each reference point from the capturing unit 2 (step S21). The reference points to which the TCP moves are deduced on the basis of the position and attitude of the tool chuck 1261 (position and attitude of the TCP) at the time of the input of the calibration initiation instruction. Specifically, for example, the central reference point P5 is set to the position of the TCP at the time of the input of the calibration initiation instruction, and the other reference points are deduced with a plane perpendicular to the rotary shaft member 126 at the time of the input of the calibration initiation instruction as the reference plane. The output unit 33 outputs the coordinates of such deduced nine reference points in the robot coordinate system to the control unit 14 as target values.

Figure 7:
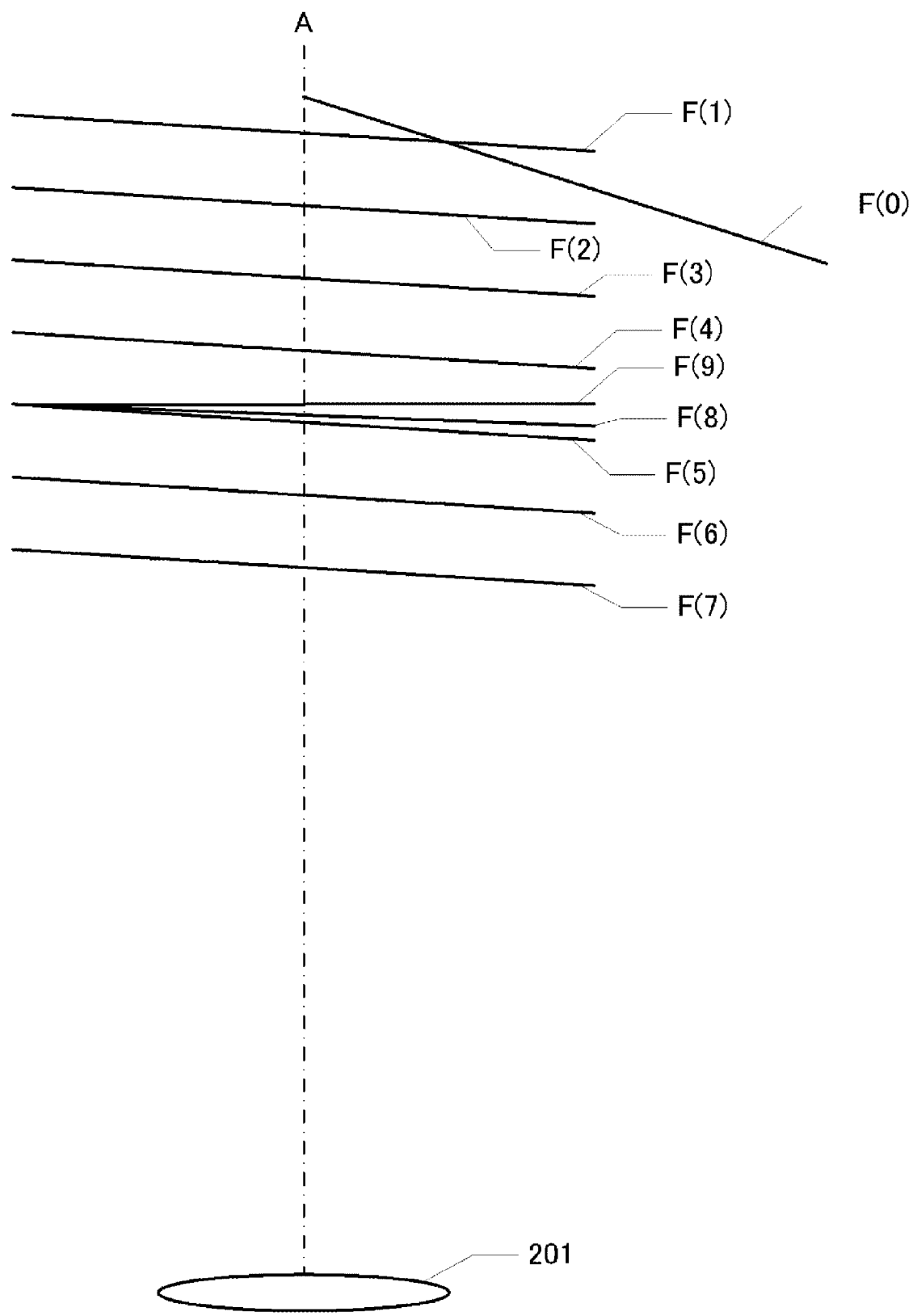
FIG. 7 is a schematic diagram according to the embodiment of the invention.
Figure 8A:
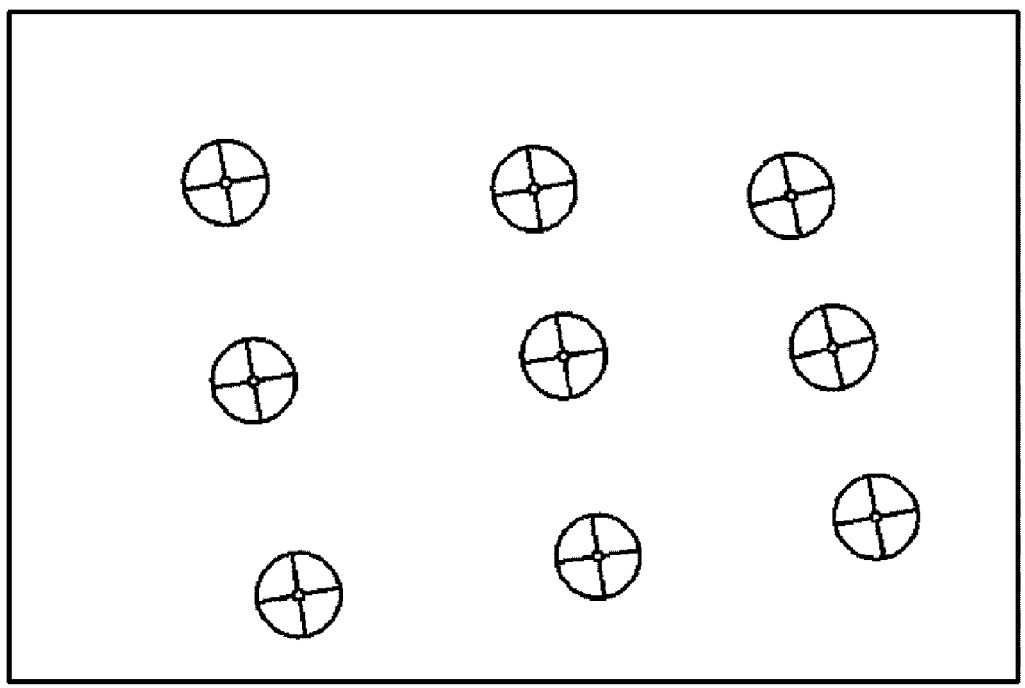
FIG. 8A is a diagram illustrating an image according to the embodiment of the invention.
Figure 8B:
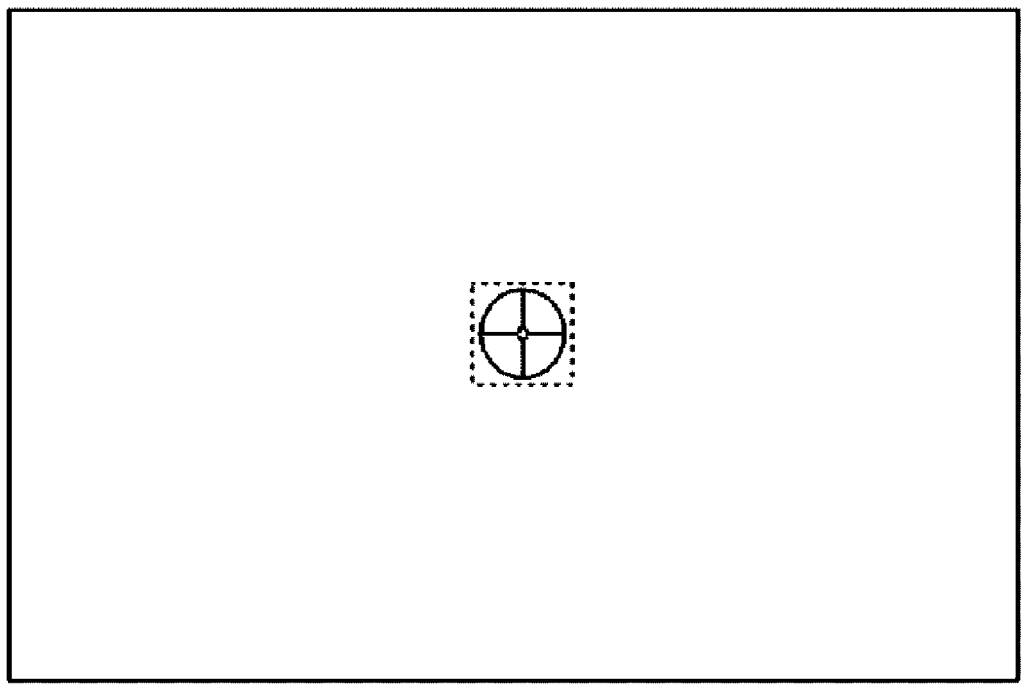
FIG. 8B is a diagram illustrating an image according to the embodiment of the invention.

The nine images captured by the capturing unit 2 will be described by using FIG. 7 and FIGS. 8A to 8D. FIG. 7 schematically illustrates the position and attitude of a reference plane F(n) with respect to the capturing unit 2. F(0) is the reference plane captured in step S21. When images are captured each time the TCP as a marker is moved to the nine reference points P1 to P9, the positions of the tool chuck 1261 in each image obtained from the capturing unit 2 are different according to the positions of the reference points P1 to P9. When the tool chuck 1261 that is represented in each of the nine images is collectively represented in one image, the tool chuck 1261 is represented as a non-lattice point, for example, as illustrated in FIG. 8A. The extent of focusing is not reflected in FIGS. 8A to 8D. Information of the reference points that are obtained from n images in which the marker at each reference point is captured by the capturing unit fixed in the robot coordinate system after the robot is moved to each reference point that is set in the same plane in the robot coordinate system as indicated by the marker is approximately the same as information of the reference points that are obtained from one image in which the marker attached to a plate is captured while the plate to which the marker that indicates the n reference points is attached is held by the robot in a specific position and attitude. A strict correspondence between the robot coordinate system and the coordinate system of the capturing unit is reflected on the former information, and a correspondence between the coordinate system of the capturing unit and a coordinate system that is formed by combining the robot coordinate system and the coordinate system of the plate to which the marker is attached is reflected on the latter information. The robot coordinate system and the coordinate system of the plate to which the marker is attached are not necessarily in a linear relationship. Thus, the former information is preferably used to strictly calibrate the robot coordinate system and the coordinate system of the capturing unit.

Next, the target value deducing unit 32 analyzes the nine images that are captured when the TCP is positioned at each reference point and detects the position of the center of the installation face of the tool chuck 1261 in each image (step S22). That is, the target value deducing unit 32 detects the positions of the nine reference points in the coordinate system of the capturing unit 2.

Next, the target value deducing unit 32 deduces the correspondence between the coordinate system of the capturing unit 2 and the robot coordinate system on the basis of the coordinates of the reference points in the coordinate system of the reference plane and the coordinates of the reference points in the coordinate system of the capturing unit 2 (step S23). Specifically, the target value deducing unit 32 deduces a transformation matrix for transforming the coordinate system of the capturing unit 2 into the robot coordinate system. Obtaining such a transformation matrix is the same as calibrating the coordinate system of the capturing unit 2 and the robot coordinate system with respect to the reference plane that is set in step S21. However, the transformation matrix is deduced on the basis of images that are captured when the capturing unit 2 does not focus on the reference points P1 to P9. Thus, the transformation matrix does not accurately correspond to the attitude of the reference plane with respect to the optical axis of the capturing unit 2 or to the positions of the reference points P1 to P9.

Next, the target value deducing unit 32, on the basis of the transformation matrix deduced in step S23, deduces target values for moving the reference plane to a position and attitude where the reference plane is perpendicular to the optical axis of the capturing unit 2 and where the optical axis of the capturing unit 2 passes through the central reference point P5. The target values deduced are output by the output unit 33 to the control unit 14 of the robot 1 (step S24). By moving the arms 111 to 115 according to the input target values, the reference plane has a position and attitude where the reference plane is approximately perpendicular to the optical axis of the capturing unit 2 and where the optical axis of the capturing unit 2 approximately passes through the central reference point P5. That is, when the low-accuracy inclination correction ends, the positional relationship between the capturing unit 2 and the reference points P1 to P9 becomes the low-accuracy perpendicular state.

1-3-3. Focal Point Adjustment

Figure 6:
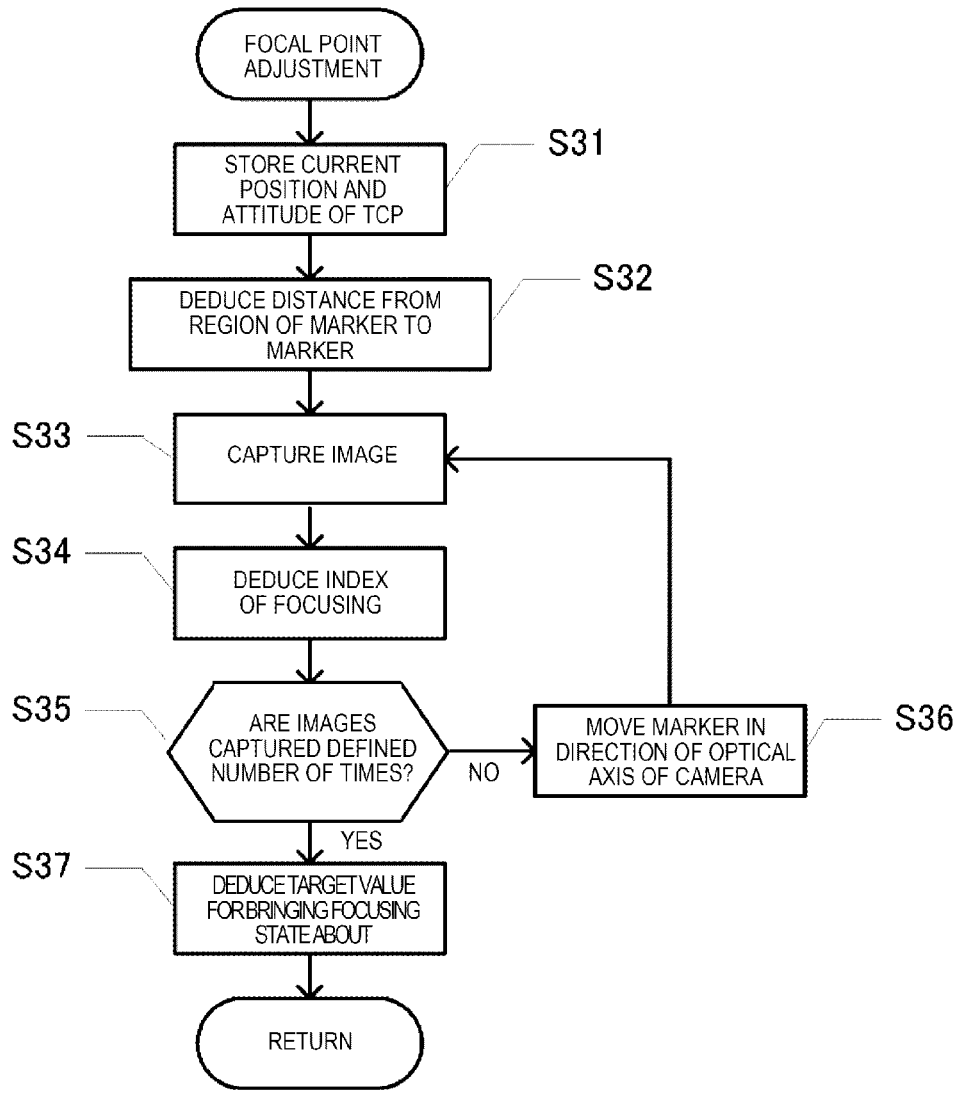
FIG. 6 is a flowchart according to the embodiment of the invention.

Next, the focal point adjustment will be described in detail with reference to FIG. 6.

First, the target value deducing unit 32 stores the current position and attitude of the TCP (step S31). That is, the position and attitude of the TCP that correspond to a reference plane F(1) at the time of the end of the low-accuracy inclination correction as illustrated in FIG. 7 are stored.

Next, the target value deducing unit 32 deduces the region where the tool chuck 1261 is captured in an image that is obtained during the focal point adjustment and deduces the distance from the capturing unit 2 to the tool chuck 1261 on the basis of the coordinates of the reference points in the coordinate system of the reference plane and the coordinates of the reference points in the coordinate system of the capturing unit 2 deduced during the low-accuracy inclination correction (step S32).

Next, the image obtaining unit 31 obtains the image from the capturing unit 2 (step S33). At this time, the image obtaining unit 31 obtains the image in which the tool chuck 1261 is captured in the region deduced in step S32.

Next, the target value deducing unit 32 deduces the index of focusing of the capturing unit 2 on the basis of the image obtained from the capturing unit 2 (step S34). As the index of focusing, a value that is obtained by standardizing the sum of differentials (sharpness) of the region, in which the tool chuck 1261 is captured, in a certain area can be used. A target region for deducing the index of focusing is set to the region of the image in which the tool chuck 1261 is captured as the region surrounded by a dotted line in FIG. 8B. That is, the index of focusing is deduced on the basis of a partial image that is clipped out of the image in which the tool chuck 1261 as a marker is captured by the capturing unit 2.

Next, the target value deducing unit 32 determines whether the number of images captured by the capturing unit 2 in the focal point adjustment reaches a defined number (step S35).

Figure 8C:
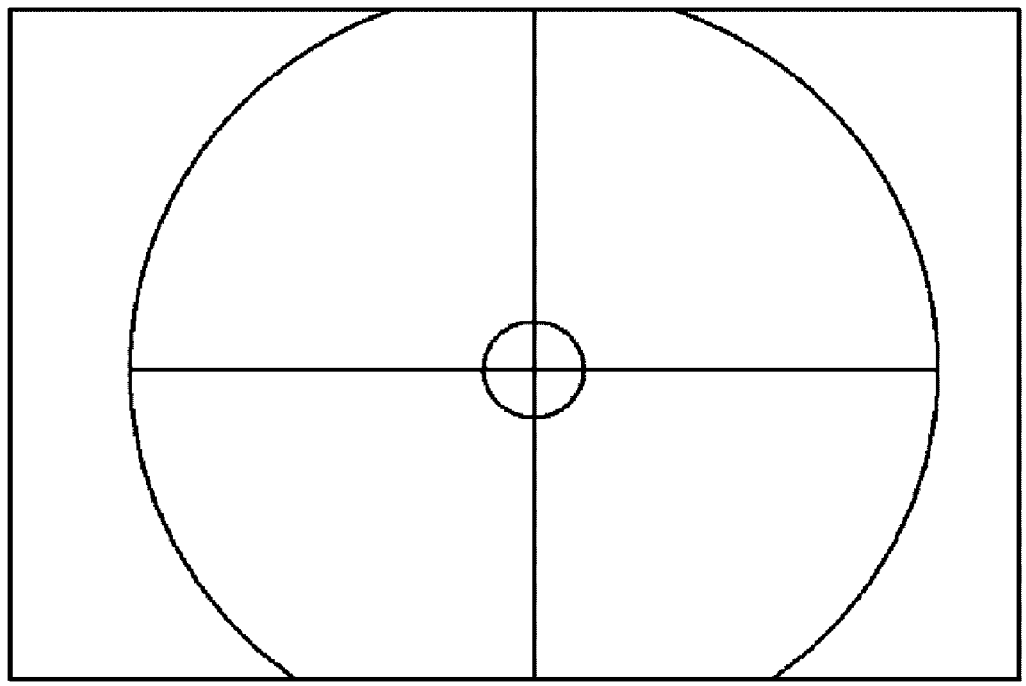
FIG. 8C is a diagram illustrating an image according to the embodiment of the invention.
Figure 8D:
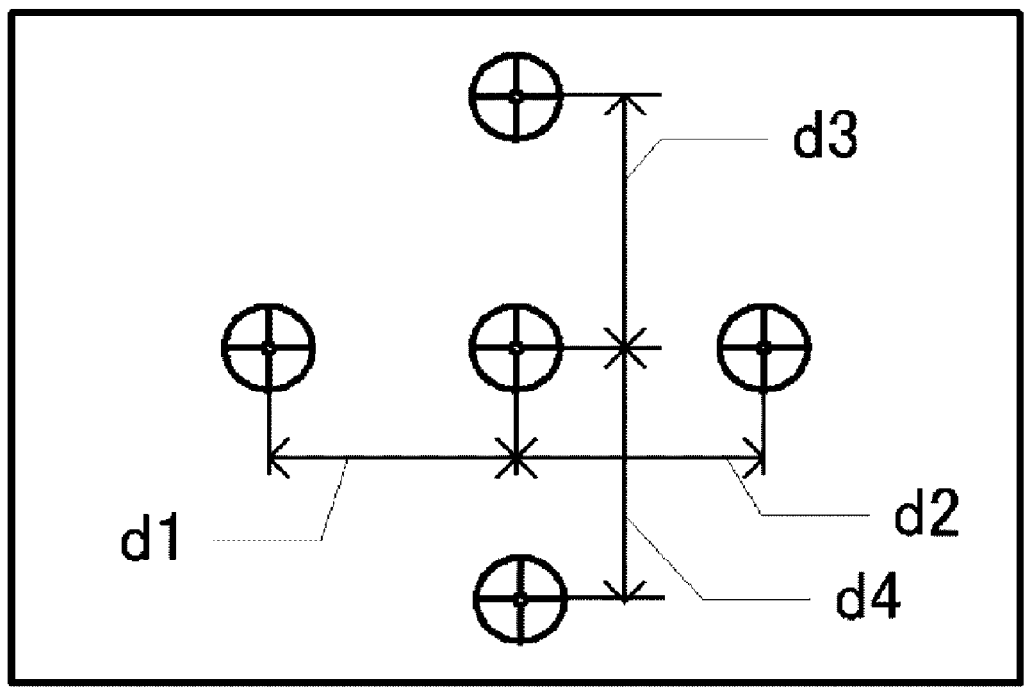
FIG. 8D is a diagram illustrating an image according to the embodiment of the invention.

When the number of images captured by the capturing unit 2 in the focal point adjustment does not reach the defined number, the target value deducing unit 32 moves the TCP by a predetermined distance in a direction perpendicular to the reference plane toward the capturing unit 2 (step S36), and the processes are repeated from step S33. That is, the reference plane moves to F(2), F(3), F(4), . . . as illustrated in FIG. 7 along with the TCP of the robot 1 until the number of images captured reaches the defined number. Images are captured by the capturing unit 2 with respect to each reference plane, and the index of focusing is deduced for each captured image. As the tool chuck 1261 approaches the capturing unit 2, the region in which the tool chuck 1261 is captured increases, and soon the tool chuck 1261 does not fit in the image as illustrated in FIG. 8C. Therefore, the target region for deducing the index of focusing is set to be greater as the tool chuck 1261 approaches the capturing unit 2 and becomes the entire image after the region in which the tool chuck 1261 is captured is in contact with the edges of the image. When the index of focusing is deduced with the region that is set as such, usually, the index of focusing gradually increases and then gradually decreases if the index of focusing is sharpness.

When the number of images captured by the capturing unit 2 reaches the defined number in the focal point adjustment, the target value deducing unit 32 deduces target values for the focusing state on the basis of the index of focusing, and the output unit 33 outputs the deduced target values to the robot 1 (step S37). Specifically, for example, target values for moving the TCP to a position where the maximum index of focusing is obtained among the plurality of indexes of focusing deduced in step S34 are deduced. When the target values deduced are output to the robot 1, the reference plane is set into the focusing state with respect to the capturing unit 2. Usually, the focusing state is brought about when the arms 111 to 115 move such that the TCP moves in a direction perpendicular to the reference plane away from the capturing unit 2 as the reference plane moves from F(7) to F(5) in FIG. 7.

As described hereinbefore, in the focal point adjustment, target values for the focusing state are deduced on the basis of the partial image that is clipped out of the image in which the tool chuck 1261 as a marker is captured after the reference points are caused to approach in a first direction perpendicular to the reference plane toward the capturing unit 2. The arms 111 to 115 change the positional relationship between the reference points and the capturing unit 2 to the focusing state on the basis of the target values deduced. Since the focal point adjustment is performed in the low-accuracy perpendicular state, the reference plane is perpendicular to the optical axis of the capturing unit 2. Therefore, moving the reference points in a direction perpendicular to the reference plane is approximately the same as changing the capturing unit 2 and the reference points in a direction parallel to the optical axis of the capturing unit 2.

1-3-4. High-Accuracy Inclination Correction

Figure 9:
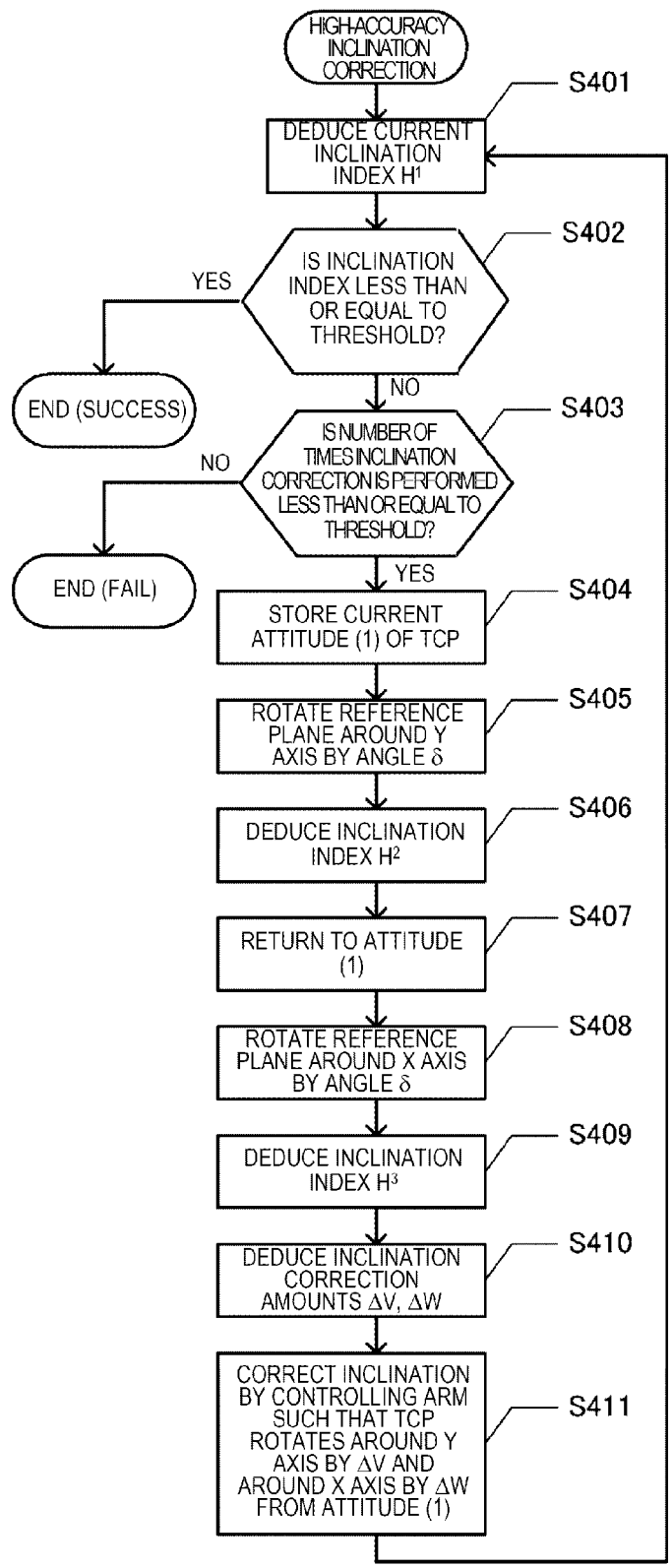
FIG. 9 is a flowchart according to the embodiment of the invention.

Next, the high-accuracy inclination correction will be described in detail with reference to FIG. 9.

First, the target value deducing unit 32 deduces a current inclination index $H^1$ (step S401). The inclination index is deduced by using the coordinates of the central reference point P5 and the four reference points P2, P4, P6 and P8 in the vicinity of the central reference point P5, all of which belong to the same reference plane, in the coordinate system of the reference plane and in the coordinate system of the capturing unit 2. In the image (refer to FIG. 8D) that is captured by the capturing unit when the reference plane is perpendicular to the optical axis of the capturing unit 2 and when the optical axis of the capturing unit 2 passes through the central reference point P5, distances d1, d2, d3, and d4 between the tool chuck 1261 and each reference point are the same. Given that the coordinates of a reference point Pn are represented as p(n), the following equations are established.

$$u_1 = u_2$$

$$v_1 = v_2$$

(where $u_1=p(5)-p(4)$, $u_2=p(6)-p(5)$, $v_1=p(5)-p(2)$, and $v_2=p(8)-p(5)$)

When the reference plane rotates from the perpendicular state around a straight line that connects the reference point P2 to the reference point P8, the difference between $v_1$ and $v_2$ increases according to the angle of rotation. When the reference plane rotates from the perpendicular state around a straight line that connects the reference point P4 to the reference point P6, the difference between $u_1$ and $u_2$ increases according to the angle of rotation. Therefore, following equations $H_x$ and $H_y$ can be used as the inclination index.

$$H_x = |u_1 - u_2|$$

$$H_y = |v_1 - v_2|$$

Next, the target value deducing unit 32 compares the deduced inclination indexes $H_x$ and $H_y$ with a predetermined threshold and determines whether the inclination indexes $H_x$ and $H_y$ are less than or equal to the predetermined threshold (step S402). When the inclination indexes $H_x$ and $H_y$ are less than or equal to the predetermined threshold, the high-accuracy inclination correction ends successfully.

When the inclination indexes $H_x$ and $H_y$ are not less than or equal to the predetermined threshold, the target value deducing unit 32 determines whether the number of times the inclination correction of below-described step S411 is performed is less than the predetermined threshold (step S403). When the number of times the inclination correction is performed is not less than the predetermined threshold, the high-accuracy inclination correction ends unsuccessfully. When the high-accuracy inclination correction ends unsuccessfully, the automatic calibration may end or may be performed again from the low-accuracy inclination correction.

When the number of times the inclination correction is performed is less than the predetermined threshold, the target value deducing unit 32 stores the current attitude of the TCP as an attitude (1) (step S404).

Next, the target value deducing unit 32 deduces target values for rotating the reference plane around the Y axis by d degrees, and the output unit 33 outputs the deduced target values to the robot (step S405). The angle d is a minute angle that is determined in advance according to error allowed in the high-accuracy perpendicular state. Next, the target value deducing unit 32 sets new reference points in the reference plane that rotates along with the TCP according to the target values and deduces an inclination index $H^2$ by analyzing images that are captured when the TCP is positioned at each new reference point (step S406). Specifically, the target value deducing unit 32 deduces target values for moving the TCP to the reference points P2, P4, P5, P6, and P8 that belong to a new reference plane after the rotation. The output unit 33 outputs the deduced target values to the robot 1. The image obtaining unit 31 obtains the images that are captured when the TCP is positioned at each reference point from the capturing unit 2. The target value deducing unit 32 deduces the inclination index $H^2$ by analyzing such obtained images in the same manner as step S401. In consequence, the inclination index $H^2$ is deduced with respect to the reference plane that is rotated around the Y axis by d degrees from the reference plane which corresponds to the attitude (1). Next, the output unit 33 outputs target values for returning the TCP to the attitude (1) to the robot 1 (step S407).

Next, the target value deducing unit 32 deduces target values for rotating the reference plane around the X axis by d degrees, and the output unit 33 outputs the deduced target values to the robot (step S408). Next, the target value deducing unit 32 sets new reference points in the reference plane that rotates along with the TCP according to the target values and deduces an inclination index $H^3$ by analyzing images that are captured when the TCP is positioned at each new reference point (step S409). In consequence, the inclination index $H^3$ is deduced with respect to the reference plane that is rotated around the X axis by d degrees from the reference plane which corresponds to the attitude (1).

Next, the target value deducing unit 32 deduces inclination correction amounts DV and DW on the basis of the inclination indexes $H^1$, $H^2$, and $H^3$ (step S410). The inclination correction amounts DV and DW are deduced by the following equation.

$$\begin{pmatrix} \frac{\partial H_x}{\partial V} & \frac{\partial H_x}{\partial W} \\ \frac{\partial H_y}{\partial V} & \frac{\partial H_y}{\partial W} \end{pmatrix} = \begin{pmatrix} \frac{H_x^2 - H_x^1}{\partial} & \frac{H_x^3 - H_x^1}{\partial} \\ \frac{H_y^2 - H_y^1}{\partial} & \frac{H_y^3 - H_y^1}{\partial} \end{pmatrix} \quad [\text{Math. 1}]$$

$$\begin{pmatrix} H_x^1 \\ H_y^1 \end{pmatrix} = -\begin{pmatrix} \frac{\partial H_x}{\partial V} & \frac{\partial H_x}{\partial W} \\ \frac{\partial H_y}{\partial V} & \frac{\partial H_y}{\partial W} \end{pmatrix} \begin{pmatrix} \Delta V \\ \Delta W \end{pmatrix}$$

Therefore, $$\begin{pmatrix} \Delta V \\ \Delta W \end{pmatrix} = -\begin{pmatrix} \frac{\partial H_x}{\partial V} & \frac{\partial H_x}{\partial W} \\ \frac{\partial H_y}{\partial V} & \frac{\partial H_y}{\partial W} \end{pmatrix}^{-1} \begin{pmatrix} H_x^1 \\ H_y^1 \end{pmatrix}$$

Next, the target value deducing unit 32 deduces target values on the basis of the inclination correction amounts DV and DW deduced, and the output unit 33 outputs the deduced target values to the robot (step S411). In consequence, the reference plane rotates around the X axis by DV and around the Y axis by DW by movements of the arms 111 to 115.

In the high-accuracy inclination correction, the above processes from step S401 to step S411 are either ended with the high-accuracy perpendicular state after a positive determination is made in step S402 or repeated until a negative determination is made in step S403.

1-3-5. Nine-Point Calibration

Next, the nine-point calibration will be described. The reference plane is exactly perpendicular to the optical axis of the capturing unit 2 when the high-accuracy inclination correction succeeds. This means that the robot coordinate system and the coordinate system of the capturing unit 2 can be calibrated with respect to rotational components and scaled components in the reference plane on the basis of the coordinates of the reference points that are obtained during the completion of the high-accuracy inclination correction. In the nine-point calibration, the robot coordinate system and the coordinate system of the capturing unit 2 are accurately calibrated by adding the distortion of the lens 201 toward an arbitrary point on the reference plane. That is, in the nine-point calibration, parameters for correcting the linear relationship between the robot coordinate system and the coordinate system of the capturing unit 2 non-linearly are deduced by using the coordinates of the nine reference points in the robot coordinate system and the coordinates of the nine reference points in the coordinate system of the capturing unit 2. Specifically, the output unit 33 outputs target values for moving the TCP to the nine reference points to the robot 1 to move the arms 111 to 115, and the image obtaining unit 31 obtains nine images in which the tool chuck 1261 positioned at each reference point is captured. The calibrating unit 34 detects the reference points that the tool chuck 1261 indicates by analyzing each image. Next, the calibrating unit 34 deduces correction parameters for final calibration on the basis of the coordinates of the target values that the output unit 33 outputs to the robot 1 and the coordinates of the reference points that are obtained by analyzing the images. As the number of reference points that are used to deduce the parameters used in such non-linear correction is greater, the accuracy of calibration increases.

1-4. Modification Example

It is needless to say that the coordinate system of the capturing unit 2 and the robot coordinate system can be calibrated in the above method if the position and attitude of the capturing unit 2 are fixed in the robot coordinate system. For example, a vertical reference plane may be set by fixing the capturing unit 2 to a wall of a room such that the optical axis of the capturing unit 2 is horizontal. Alternatively, for example, a horizontal reference plane may be set by fixing the capturing unit 2 to the ceiling of the room in a vertical downward direction.

2. Second Embodiment

Figure 10:
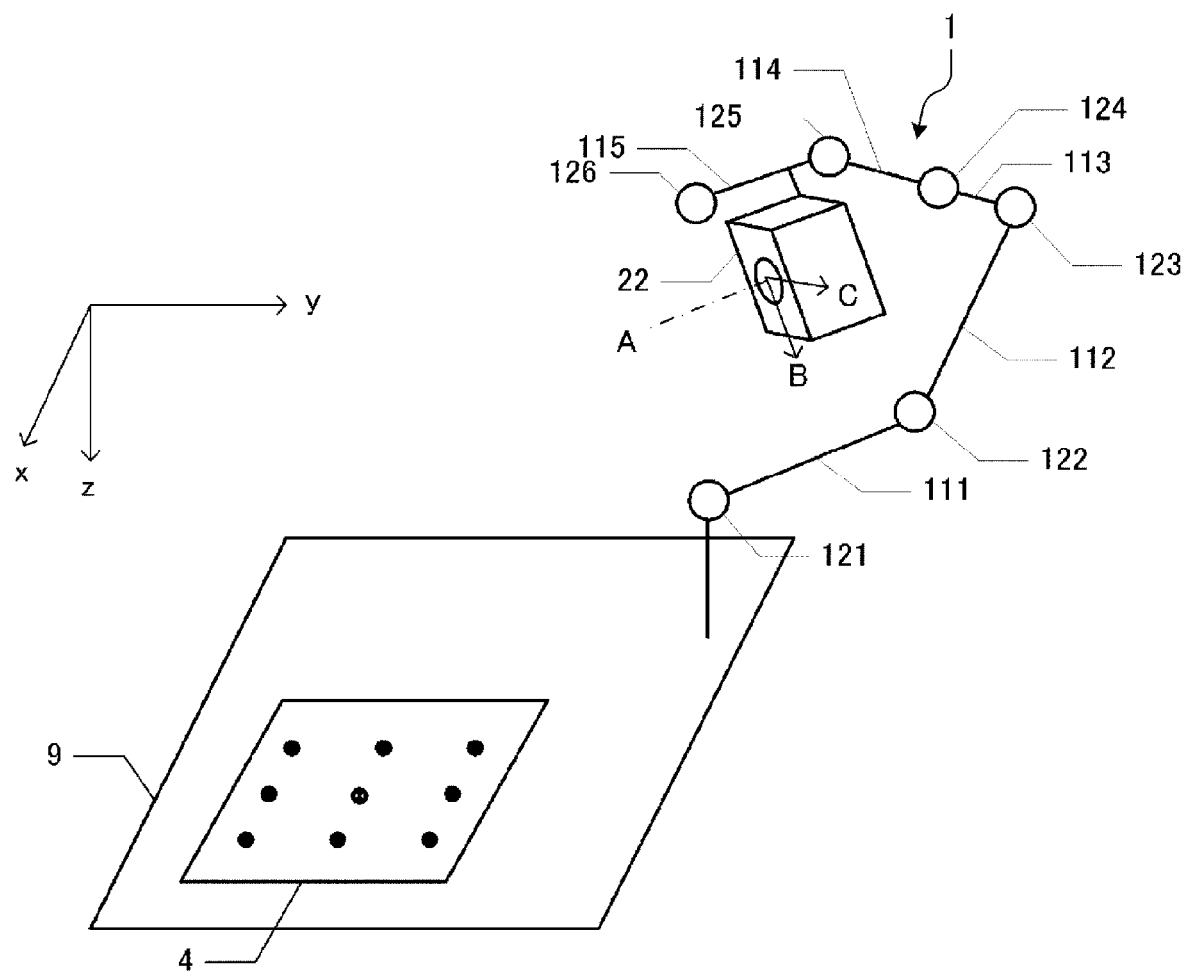
FIG. 10 is a schematic perspective view according to the embodiment of the invention.

A robot system in which a capturing unit 22 is mounted on a movable portion of the robot 1 will be described in the present embodiment. In the present embodiment, the capturing unit 22 is assumed to be fixed to the arm 111 by a stay and the like such that the optical axis of the capturing unit 22 is parallel to the rotary shaft member 126 as illustrated in FIG. 10. In the first embodiment, the reference plane which is the target of calibration is set while the reference points are moved in the robot coordinate system so as to calibrate the robot vision of the capturing unit 2 that is fixed in the robot coordinate system. Regarding this point, in the present embodiment, calibration is performed in a state where the capturing unit 22 is moved by the robot 1 such that the optical axis of the capturing unit 22 is perpendicular to the reference plane which is the target of calibration because the reference plane which is the target of calibration is fixed in the robot coordinate system from the first.

Figure 11:
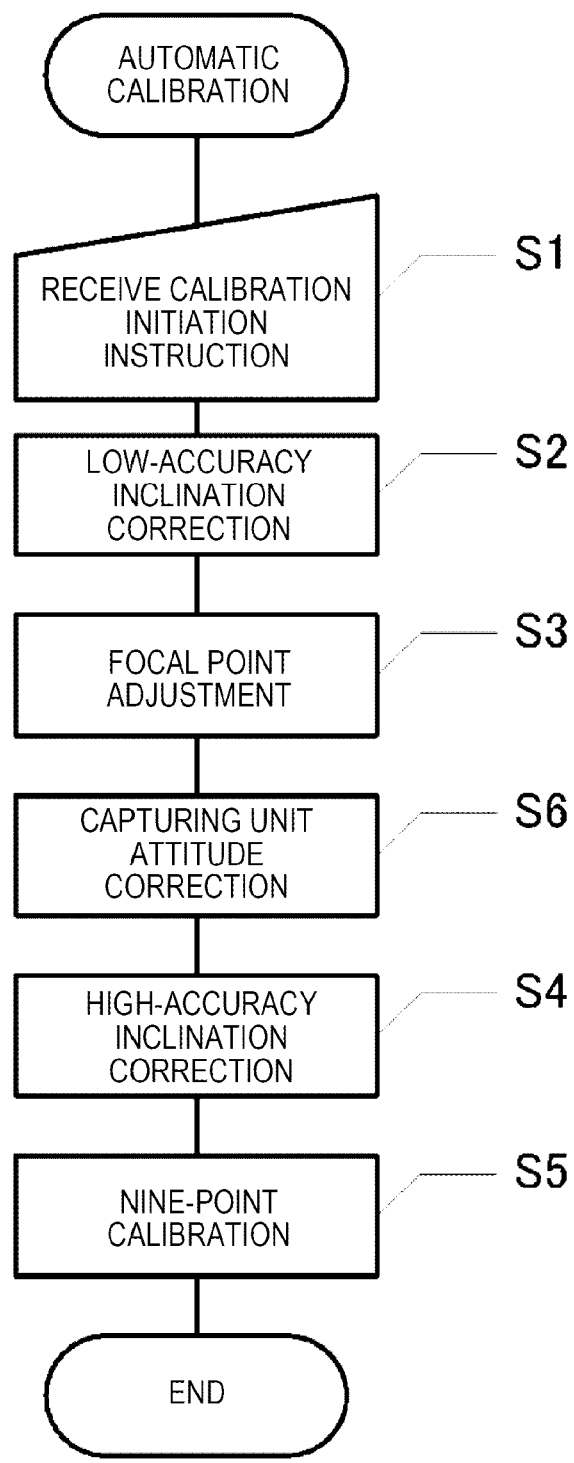
FIG. 11 is a flowchart according to the embodiment of the invention.

Hereinafter, the automatic calibration of the robot system in which the capturing unit 22 is mounted on the movable portion of the robot 1 will be described with reference to FIG. 11. The automatic calibration of the present embodiment is performed on the assumption that the optical axis of the capturing unit 22 is approximately parallel to the rotary shaft member 126. The capture position and capture attitude of the capturing unit 22 with respect to the arm 115 are required to be set as environment information in a preparation step before the input of the calibration initiation instruction. The capture position is a position where the optical axis of the capturing unit 22 intersects the area image sensor 202. The capture attitude is the attitude of the optical axis of the capturing unit 22. The capture position and capture attitude of the capturing unit 22 that are set as environment information with respect to the arm 115 do not have to strictly correspond to the installation state of the capturing unit 22 in the arm 115 at the initiation of the automatic calibration.

Figure 12:
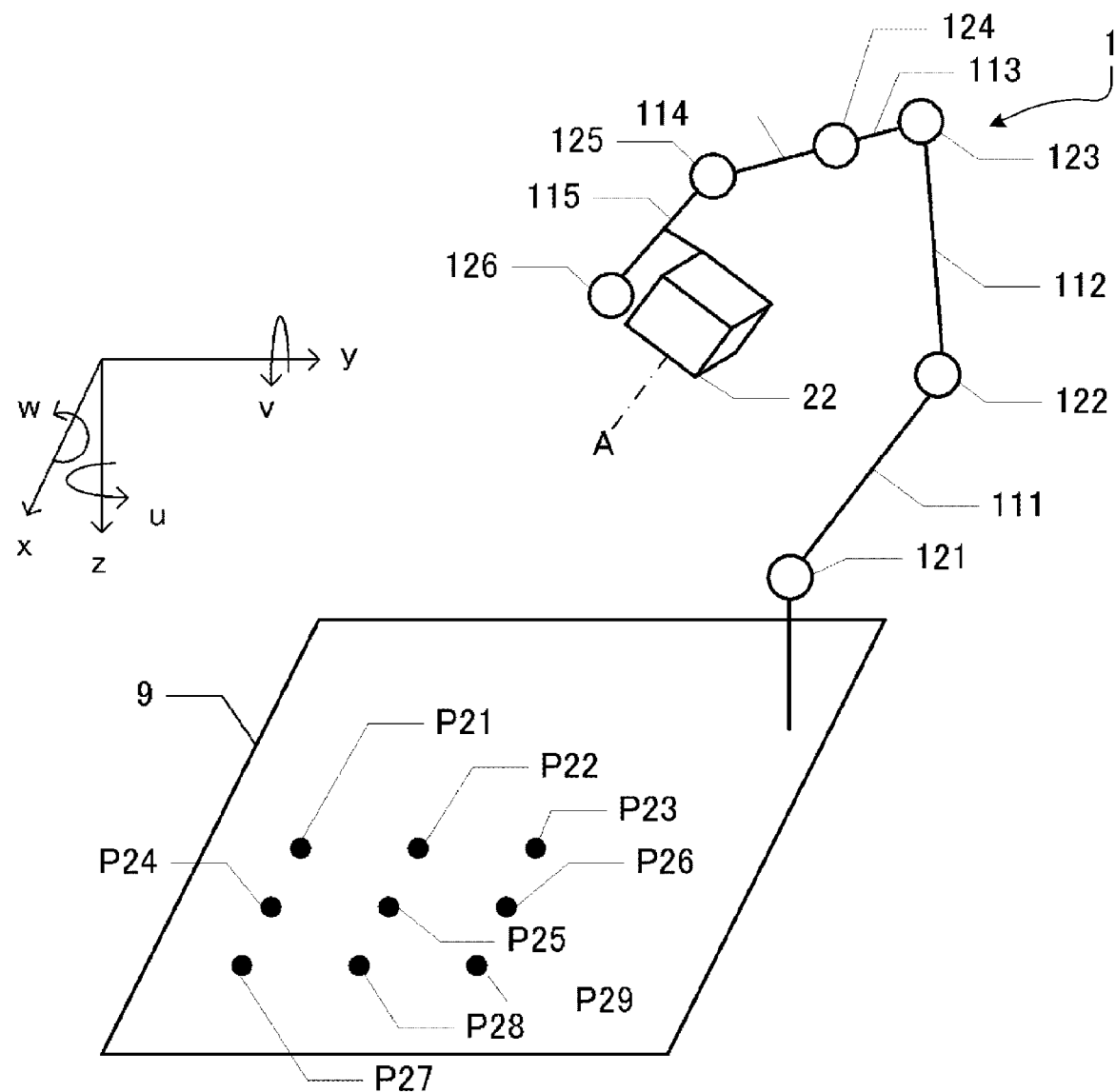
FIG. 12 is a schematic perspective view according to the embodiment of the invention.
Figure 13:
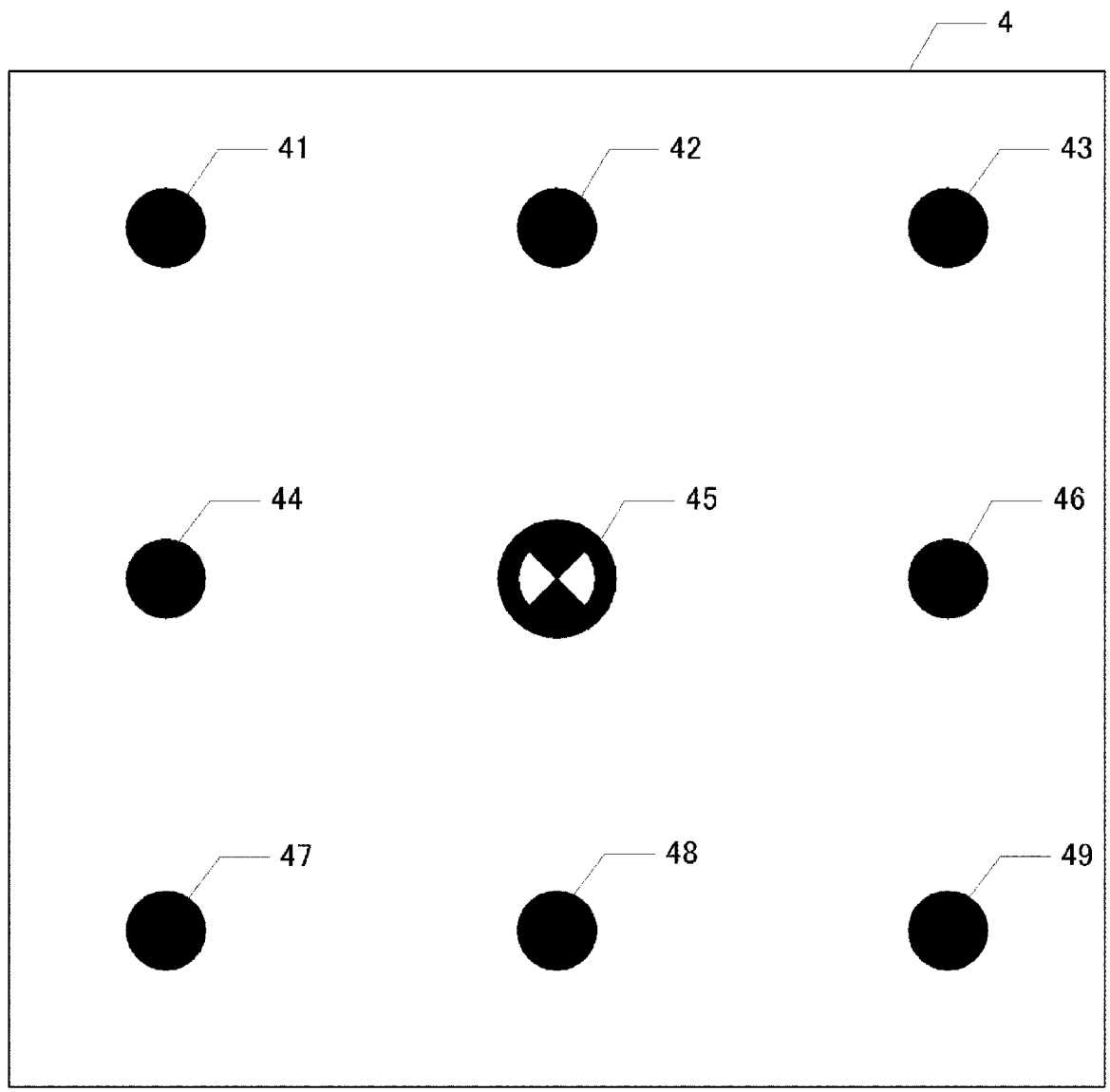
FIG. 13 is a schematic plan view according to the embodiment of the invention.

The automatic calibration of the present embodiment is performed on nine reference points P21 to P29 that are fixed in the robot coordinate system as illustrated in FIG. 12. The reference points P21 to P29 are lattice points that are included in one reference plane which can be arbitrarily set. Therefore, in the preparation step, a marker board 4 to which markers 41 to 49 illustrated in FIG. 13 are attached is fixed to the table 9 as illustrated in FIG. 10. The marker board 4 is a plate on which the nine markers 41 to 49 having circular contours are attached at predetermined lattice points in a flat face. The position of the center of each of the markers 41 to 49 on the marker board 4 is retained by the target value deducing unit 32 in a two-dimensional coordinate system that is fixed to the marker board 4 (marker coordinate system). The center of each of the markers 41 to 49 is defined as the reference points P21 to P29. It is sufficient that the marker is a marker having a form that causes the reference point to be specified by detecting the marker from an image in which the marker is captured. That is, it is sufficient that the marker has a form with which the position of a specific point can be geometrically defined with respect to the figure of the marker. A point that is separated from the marker may be defined as a reference point. A plurality of reference points may be defined from one marker. Alternatively, one reference point may be defined by a plurality of separated markers.

When the instruction receiving unit 30 receives the calibration initiation instruction (step S1), the low-accuracy inclination correction is performed (step S2). Since the markers 41 to 49 attached to the marker board 4 indicate nine reference points, the robot 1 does not have to move to each reference point in the low-accuracy inclination correction of the present embodiment. When the calibration initiation instruction is received in a state where the entire marker board 4 can be captured by the capturing unit 22, the image obtaining unit 31 obtains one image in which the nine markers 41 to 49 are captured from the capturing unit 22. The target value deducing unit 32 analyzes the one obtained image and detects the nine reference points indicated by the markers 41 to 49 in the coordinate system of the capturing unit 22. Next, the target value deducing unit 32 deduces the correspondence between the coordinate system of the capturing unit 22 and the robot coordinate system on the basis of the coordinates of the reference points in the coordinate system of the capturing unit 22, the capture position and capture attitude of the capturing unit 22 that are input as environment information, and the coordinates of the markers 41 to 49 in the marker coordinate system. Specifically, the target value deducing unit 32 deduces a transformation matrix for transforming the coordinate system of the capturing unit 22 into the robot coordinate system with respect to the reference plane where the markers 41 to 49 are positioned. However, the transformation matrix deduced here is deduced on the basis of an image that is captured when the capturing unit 22 does not focus on the markers 41 to 49. Thus, the transformation matrix does not accurately correspond to the capture position and capture attitude of the capturing unit 22 with respect to the reference points P21 to P29. Next, the target value deducing unit 32, on the basis of the deduced transformation matrix, deduces target values for moving the arm 115 to a position and attitude where the optical axis of the capturing unit 22 is perpendicular to the marker board 4 and where the optical axis of the capturing unit 22 passes through the center of the central marker 45. The target value deducing unit 32 outputs the deduced target values to the control unit 14 of the robot 1 through the output unit 33. By moving the arms 111 to 115 according to the input target values, the optical axis of the capturing unit 22 becomes approximately perpendicular to the marker board 4 and passes through an approximate center of the central marker 45. That is, when the low-accuracy inclination correction ends, the positional relationship between the capturing unit 22 and the reference plane becomes the low-accuracy perpendicular state.

Next, the focal point adjustment is performed (step S3). The focal point adjustment of the present embodiment is the same as the focal point adjustment of the first embodiment except that the arm 115 is moved such that the sharpness of a region in which the central marker 45 of the marker board 4 is captured is maximized instead of moving the TCP such that the sharpness of the region in which the tool chuck 1261 is captured is maximized. When the focal point adjustment ends, the positional relationship between the capturing unit 22 and the reference point P25 becomes the focusing state.

Next, capturing unit attitude correction is performed (step S6). The capturing unit attitude correction is a process of correcting the difference between the capture attitude of the capturing unit 22 that is set as environment information and the actual capture attitude of the capturing unit 22 by correcting the environment information. Details of the capturing unit attitude correction will be described below.

Next, the high-accuracy inclination correction is performed (step S4). The high-accuracy inclination correction is the same as the high-accuracy inclination correction of the first embodiment except for the following point. The central reference point P5 among the five reference points used in the first embodiment is set to the current capture position of the capturing unit 22. In addition, the remaining four reference points P2, P4, P6, and P8 of the five reference points used in the first embodiment are set as the capture position of the capturing unit 22 at intervals of 90 degrees around the current capture position of the capturing unit 22 on a plane that is perpendicular to the optical axis of the capturing unit 22 and that includes the current capture position of the capturing unit 22. The capture position and capture attitude of the capturing unit 22 that are environment information corrected in step S4 and the current position and attitude of the arm 115 are used in setting these five capture positions. The capturing unit 22 of which the optical axis is perpendicular to the plane that includes the five capture positions captures the marker board 4 at the five capture positions that are set as above, and the image obtaining unit 31 obtains five images. The target value deducing unit 32 detects the center of the central marker 45 of the marker board 4 in the coordinate system of the capturing unit 22 by analyzing the five images. By using the five coordinates of the center of the marker 45 that are detected as such instead of using the coordinates of the five reference points that are detected in the high-accuracy correction of the first embodiment, the same high-accuracy inclination correction as the first embodiment is performed. By performing such high-accuracy inclination correction, target values that correspond to a state where the optical axis of the capturing unit 22 is perpendicular to the marker board 4 and passes through the center of the marker 45 are deduced. When the target values deduced are input into the robot 1, the arms 111 to 115 move on the basis of the input target values, and the optical axis of the capturing unit 22 passes through the center of the marker 45 and becomes perpendicular to the marker board 4. That is, when the high-accuracy inclination correction ends successfully, the positional relationship between the reference points P21 to P29 and the capturing unit 22 becomes the high-accuracy perpendicular state.

Figure 14:
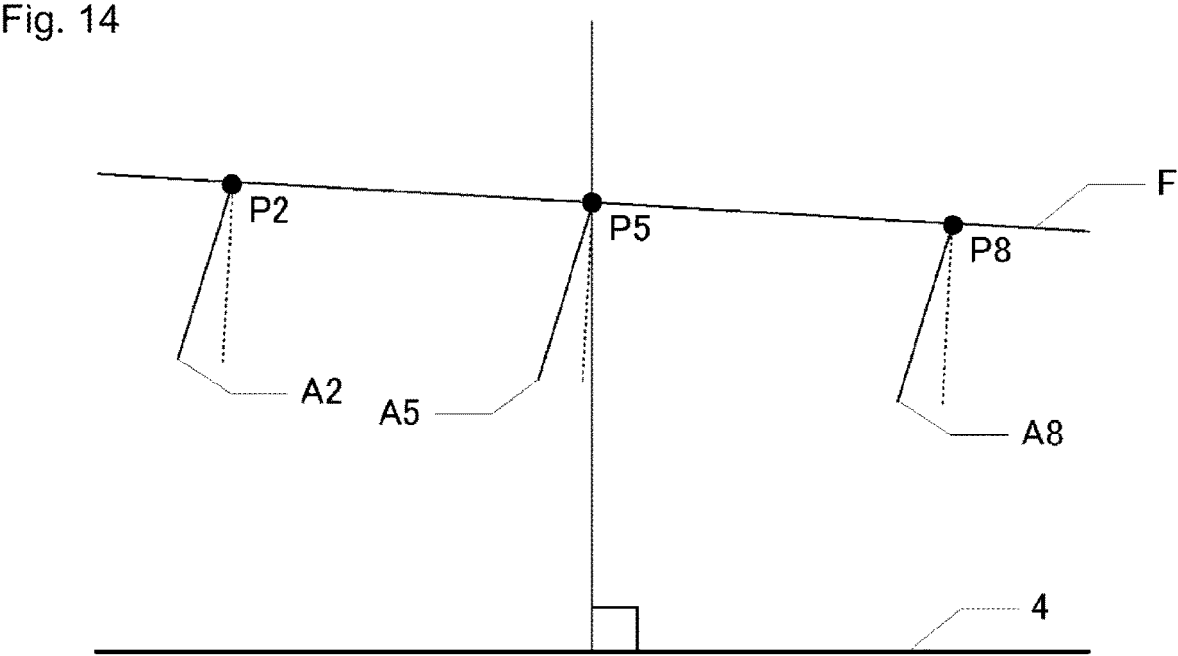
FIG. 14 is a schematic diagram according to the embodiment of the invention.

The capturing unit attitude correction of step S6 will be described in detail. For example, the capture position and capture attitude of the capturing unit 22 at the above capture positions P2, P5, and P8 where the optical axis of the capturing unit 22 corresponds to dotted lines of FIG. 14 are assumed to be set as environment information. In addition, in actuality, the capturing unit 22 is assumed to be installed in the arm 115 such that the optical axis of the capturing unit 22 at the capture positions P2, P5, and P8 corresponds to solid lines A2, A5, and A8 that are not perpendicular to a reference plane F. In this case, the high-accuracy inclination correction is assumed to be performed by capturing the marker board 4 with the capturing unit 22 that is positioned at the capture positions P2, P5, and P8. However, the optical axis of the capturing unit 22 does not become perpendicular to the marker board 4 even when the arms 111 to 115 operate on the basis of the target values that are deduced in the high-accuracy inclination correction. The reason is that the inclination index is deduced on the basis of five images that are captured by the capturing unit 22 from the five capture positions on a plane perpendicular to "optical axis of the capturing unit 22 that corresponds to erroneous environment information" while the high-accuracy inclination correction is performed on the assumption that the central marker 45 is captured five times by the capturing unit 22 from the five capture positions on a plane perpendicular to "actual optical axis of the capturing unit 22". Therefore, performing correction that matches "actual optical axis of the capturing unit 22" and "optical axis of the capturing unit 22 corresponding to the environment information" is required before the high-accuracy correction. The correction that is required before the high-accuracy correction is the capturing unit attitude correction.

In the capturing unit attitude correction, the capturing unit 22 captures images from the above five capture positions P2, P4, P5, P6, and P8 in a capture attitude (capture attitude that is based on the environment information to be corrected) where the optical axis of the capturing unit 22 is perpendicular to a plane that includes these capture positions, and the center of the central marker 45 of the marker board 4 is detected from each of the five images. Next, by using the five coordinates of the center of the marker 45 that are detected as such instead of using the coordinates of the five reference points that are detected in the high-accuracy correction of the first embodiment, the same inclination correction amounts DV and DW as the first embodiment are deduced. When the capture attitude of the capturing unit 22 as environment information is corrected by using the deduced correction amounts DV and DW, "actual optical axis of the capturing unit 22" and "optical axis of the capturing unit 22 that corresponds to the environment information" can be matched.

The nine-point calibration is performed (step S5) after the high-accuracy inclination correction ends successfully. In the nine-point calibration of the present embodiment, instead of detecting the position of each reference point in the coordinate system of the capturing unit 22 from images captured by the capturing unit 22 while the TCP is moved to the nine reference points P1 to P9 of the first embodiment, the centers of the nine markers 41 to 49 are detected as the reference points P21 to P29 from images obtained from the capturing unit 22 of which the current capture position and capture attitude are in the high-accuracy perpendicular state. Then, a final transformation equation for transforming the coordinates of the reference points P21 to P29 that are detected in the coordinate system of the capturing unit 22 into the coordinates of the reference points P21 to P29 in the robot coordinate system is deduced.

3. Third Embodiment

The state of the robot 1 is controlled by the input of target values that indicate the position and attitude of the tool chuck 1261 on which various types of tools are mounted (that is, the position and attitude of the TCP) into the robot 1. Therefore, in order to control the position and attitude of tools that are mounted on the tool chuck 1261 or on other parts, it is necessary to set in advance the position and attitude of tools as environment information with respect to the TCP, transform the position and attitude of tools into a position and attitude that correspond to the TCP, and input target values into the robot 1. In the present embodiment, a method for detecting and automatically setting the position and attitude of various types of tools with respect to the TCP by using the robot vision will be described. Detecting the position and attitude of various types of tools with respect to the TCP by using the robot vision requires the assumption that the robot coordinate system and the coordinate system of the capturing unit can be calibrated with respect to the reference plane. Therefore, in the present embodiment, it is assumed that the reference plane F that is perpendicular to the optical axis of the capturing unit 2 which is fixed to the table 9 as described in the first embodiment is set, and calibration is completed for nine reference points on the reference plane F that is set. In this state, a method for detecting the position and attitude of a tool, of which the position and attitude with respect to the TCP are fixed, with respect to the TCP by using the robot vision will be described with reference to FIGS. 15A and 15B. In the present embodiment, "position and attitude of a tool with respect to the TCP" are represented by an offset (DX, DY, DU) for specifying the position and attitude of the tool on the reference plane from the position and attitude (x, y, z, u, v, w) of the TCP. The position and attitude (x, y, z, u, v, w) of the TCP is the robot coordinate system, and the offset (DX, DY, DU) is the coordinate system of the reference plane. However, as described above, the robot coordinate system and the coordinate system of the reference plane have a linear relationship. Therefore, there is no geometric problem in defining the position and attitude of the tool in any of the robot coordinate system and the coordinate system of the reference plane. The sign DU is a rotational component around the Z axis that is perpendicular to the reference plane.

First, a reference point of the tool that is indicated by a tool marker is moved onto the reference plane by moving the TCP in a parallel manner while the attitude of the TCP where the center axis of the TCP is perpendicular to the reference plane is maintained. At this time, the center axis of the tool chuck 1261 may be moved in a parallel manner, or the tool chuck 1261 may be rotated around the center axis thereof (since DU is included in the offset). It is sufficient that the tool marker is a tool marker that indicates the reference point. The tool may also be used as the tool marker. In the present embodiment, a label as a tool marker is attached to the tool. It is sufficient that the label is a label whose shape and size are known. It is sufficient that the reference point is a point that is fixed with respect to the tool. The TCP may be moved by a jog feed when the reference point of the tool is moved to the reference plane, or the TCP may be automatically moved by using the robot vision. Specifically, since the shape and size of the tool marker are known, the position of the tool marker with respect to the reference plane before the movement is specified on the basis of an image of the tool marker that is captured before the movement. Then, target values of the TCP for moving the tool marker to the reference plane from the position of the tool marker that is specified with respect to the reference plane are deduced, and the target values deduced are output to the robot 1. Furthermore, by repeating the capturing and moving process, the reference point of the tool indicated by the tool marker can be accurately positioned on a coordinate plane.

Next, the tool marker is captured by the capturing unit 2 when the reference point of the tool is positioned on the reference plane, and the position of the reference point indicated by the tool marker is detected in the coordinate system of the capturing unit 2. Then, the offset (DX, DY, DU) for specifying the position and attitude of the tool on the reference plane from the position and attitude ($x_0$, $y_0$, $z_0$, $u_0$, $v_0$, $w_0$) of the TCP in the robot coordinate system is deduced on the basis of the coordinates of the foot of a perpendicular from the TCP down to the reference plane at the time of capturing and the coordinates of the detected reference point.

The position and attitude of the capturing unit 22 that are necessary as environment information are specified by, for example, deducing the offset (DX, DY, DU) with the capturing unit 22 of the second embodiment as a tool. Therefore, instead of causing a user to set the position and attitude of the capturing unit 22, the position and attitude of the capturing unit 22 can be automatically detected, and the detected position and attitude of the capturing unit 22 can be automatically set as environment information. Then, the coordinate system of the capturing unit 22 and the robot coordinate system can be calibrated by using the capturing unit 22 for which the environment information is automatically set as such. That is, the calibration of the robot coordinate system and each of the coordinate systems of the capturing unit 2 fixed in the robot coordinate system and the capturing unit fixed to the movable portion of the robot 1 can be automatically completed by only the input of the calibration initiation instruction. Furthermore, when a capturing unit other than the capturing unit 2 and the capturing unit 22 is added, the coordinate system of the additional capturing unit and the robot coordinate system can be calibrated by capturing the additional capturing unit with the capturing unit 22. That is, coordinate systems of a plurality of capturing units and the robot coordinate system can be automatically calibrated by, for example, operating the robot with the marker board 4.

When the environment information is required for a plurality of tools T1 and T2, the offset for specifying the position and attitude of tools may be deduced for each tool.

Figure 15A:
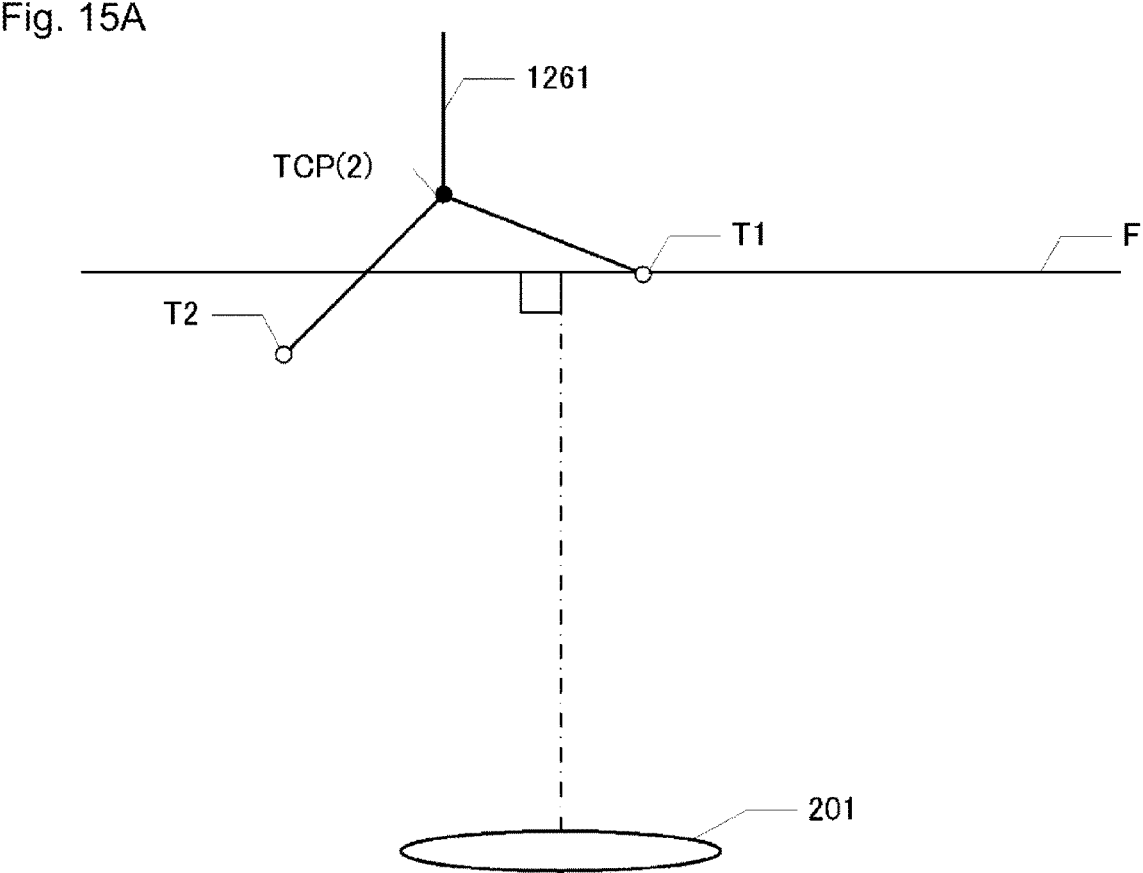
FIG. 15A is a schematic diagram according to the embodiment of the invention.
Figure 15B:
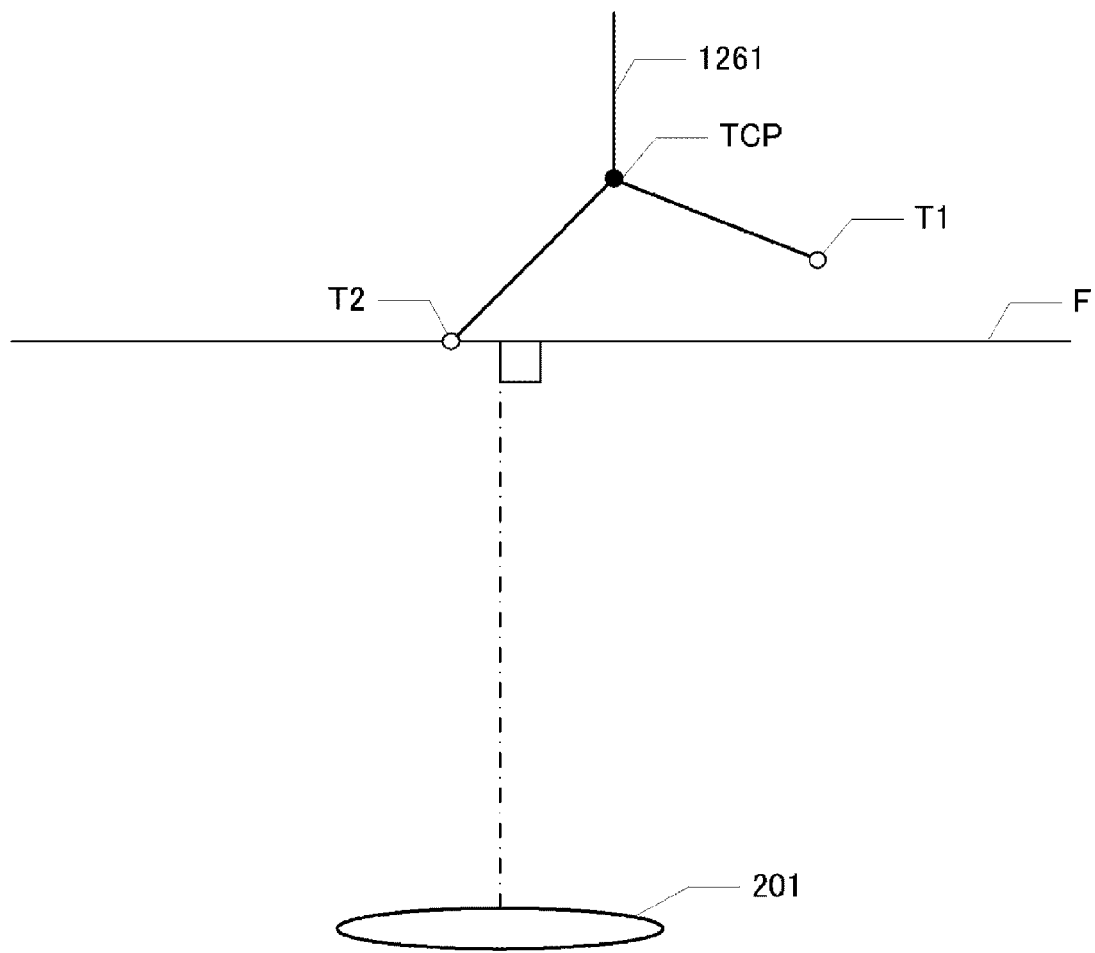
FIG. 15B is a schematic diagram according to the embodiment of the invention.

That is, the offset for the tool T1 may be deduced by moving the tool T1 to the reference plane F as illustrated in FIG. 15A, and the offset for the tool T2 may be deduced by moving the tool T2 to the reference plane F as illustrated in FIG. 15B. While an example of setting one final calibrated reference plane is described thus far, two or more calibrated reference planes may also be set. For example, a reference plane corresponding to the tool T1 and a reference plane corresponding to the tool T2 may be set, and each reference plane and the robot coordinate system may be calibrated.

4. Fourth Embodiment

In the present embodiment, as simply illustrated in FIG. 1A, the robot 1 is provided with an arm 11 and the base table 110. The arm 11 is configured of the arms 111, 112, 113, 114, and 115. Hereinafter, the same constituent members as the first embodiment will be designated by the same reference sign, and descriptions thereof will not be provided or will be simplified. It is sufficient that the base table 110 is configured not to move in the xyz coordinate system illustrated in FIG. 1A. For example, the base table 110 may be configured to include a pedestal that directly supports the arm 11 and a frame that is installed on a floor with the pedestal fixed to the upper portion thereof, may be configured as a structure that is integrated with the table 9, or may be configured as a structure that is integrated with the table 9, a frame of a belt conveyor, or a cell in which another robot is installed.

In the present embodiment, the capturing unit 2 is disposed at a point that is fixed in the xyz coordinate system which is illustrated in FIGS. 1A and 1s used when the robot 1 is controlled. That is, in the present embodiment, the capturing unit 2 is disposed at a point that is fixed in the coordinate system where the arm 11 moves. As long as the capturing unit 2 is disposed to a point that is fixed in the coordinate system in which the arm 11 moves, the automatic calibration described in the first embodiment can be performed. For example, the capturing unit 2 may be fixed to a wall, ceiling, or floor of a room where the robot 1 is installed, may be fixed to the base table 110 of the robot 1, or may be fixed to a frame of a cell to which the robot 1 is fixed.

4-1. Modification Example

As long as the capturing unit 2 is disposed to a point that is fixed in the coordinate system in which the arm 11 moves, the automatic calibration described in the first embodiment can be performed. For example, a vertical reference plane may be set by fixing the capturing unit 2 to a wall of a room such that the optical axis of the capturing unit 2 is horizontal. Alternatively, for example, the capturing unit 2 may be fixed to the floor of a room where the robot 1 is installed. The capturing unit 2 may be fixed to the base table 110 of the robot 1. The capturing unit 2 may be fixed to the frame of the cell to which the robot 1 is fixed. The capturing unit 2 may be fixed to a device such as a conveyor belt that is disposed to the robot 1. When the capturing unit 2 is fixed to an external device such as a conveyor belt, aligning the robot 1 and the external device so as to operate the robot 1 and the external device in cooperation is facilitated. When the capturing unit 2 is disposed at a point that is fixed in the coordinate system where the arm 11 moves, as described in the first embodiment, the automatic calibration is performed by positioning a marker with the arm 11 at a specific point in the xyz coordinate system that is used to control the robot 1. In this case, the marker may be fixed to any part of the arm 11. For example, although the TCP is used as a marker in the above embodiments, markers may be fixed to any of the first arm 111, the second arm 112, the third arm 113, the fourth arm 114, and the fifth arm 115.

5. Fifth Embodiment

A robot system in which the capturing unit 22 is mounted on the arm 11 which is a movable portion of the robot 1 will be described in the present embodiment. In the present embodiment, the capturing unit 22 is assumed to be fixed to the arm 111 by a stay and the like such that the optical axis of the capturing unit 22 is parallel to the rotary shaft member 126 as illustrated in FIG. 10. Hereinafter, the same constituent members as the second embodiment will be designated by the same reference sign, and descriptions thereof will not be provided or will be simplified.

5-1. Modification Example

It is needless to say that the coordinate system of the capturing unit 2 and the robot coordinate system can be calibrated in the above method if the capturing unit 2 is fixed to the arm 11. That is, as long as the capturing unit 2 is disposed at a point that is fixed to any of the first arm 111, the second arm 112, the third arm 113, the fourth arm 114, and the fifth arm 115, the automatic calibration described in the first embodiment can be performed.

When the capturing unit 2 is disposed at a point that is fixed with respect to the arm 11, the automatic calibration is performed by fixing a marker to a specific point in the xyz coordinate system (coordinate system where the arm moves) that is used to control the robot 1 as described in the second embodiment. In this case, the marker may be fixed to any point in the xyz coordinate system that is used to control the robot 1. The marker may be fixed to the floor of a room where the robot 1 is installed. The marker may be fixed to the base table 110 of the robot 1. The marker may be fixed to the frame of the cell to which the robot 1 is fixed. The marker may be fixed to a device such as a conveyor belt that is disposed to the robot 1. When the marker is fixed to an external device such as a conveyor belt, aligning the robot 1 and the external device so as to operate the robot 1 and the external device in cooperation is facilitated.

6. Sixth Embodiment

Figure 16:
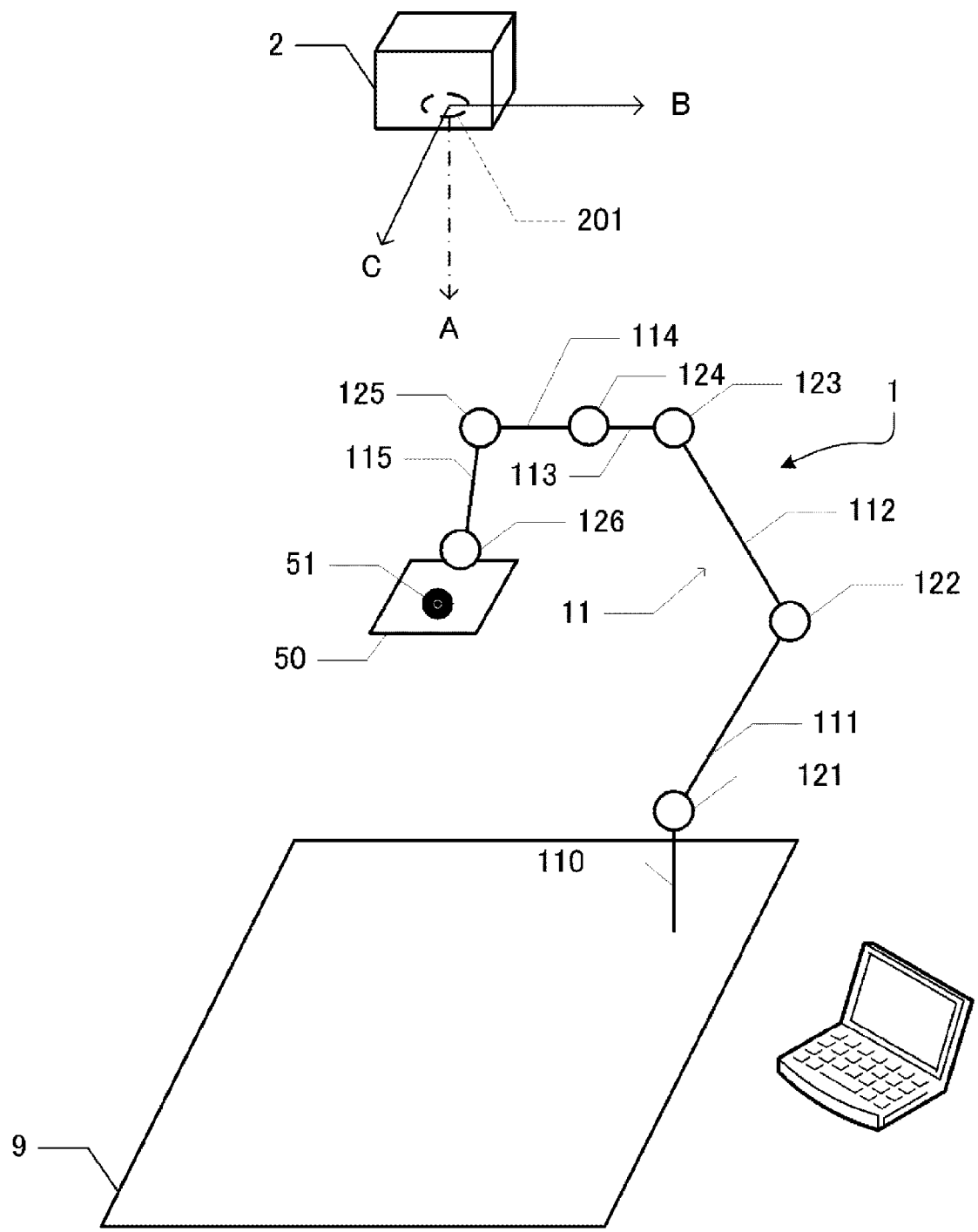
FIG. 16 is a schematic perspective view according to the embodiment of the invention.

In the present embodiment, descriptions will be provided of a robot system in which the capturing unit 2 that is installed in a vertical upward direction in the fourth embodiment is disposed above the arm 11 as illustrated in FIG. 16 in an attitude where the capturing unit 2 can capture the arm 11 and of a method for calibrating the robot coordinate system and the coordinate system of the capturing unit 2. Now, it is assumed that the capturing unit 2 is installed in a vertical downward direction above the range of possible motion of the arm 11 as illustrated in FIG. 16 and that the robot 1 performs processes on a work that is below the arm 11 while the work is captured by the capturing unit 2. In this case, the work is processed while the tool installation face of the tool chuck 1261 is directed downward. However, in this state, the tool installation face of the tool chuck 1261 that is used as a marker in the first embodiment cannot be captured by the capturing unit 2. Therefore, in the present embodiment, in order to obtain images necessary for calibrating the coordinate system of the capturing unit 2 and the robot coordinate system, a marker tool 50 on which a marker 51 that can be captured by the capturing unit 2 while the tool installation face of the tool chuck 1261 is directed downward is disposed is mounted on the tool chuck 1261. Then, the calibration of the coordinate system of the capturing unit 2 and the robot coordinate system is performed in the same manner as the first embodiment after an offset for the marker tool 50 with respect to the TCP is deduced.

Figure 17A:
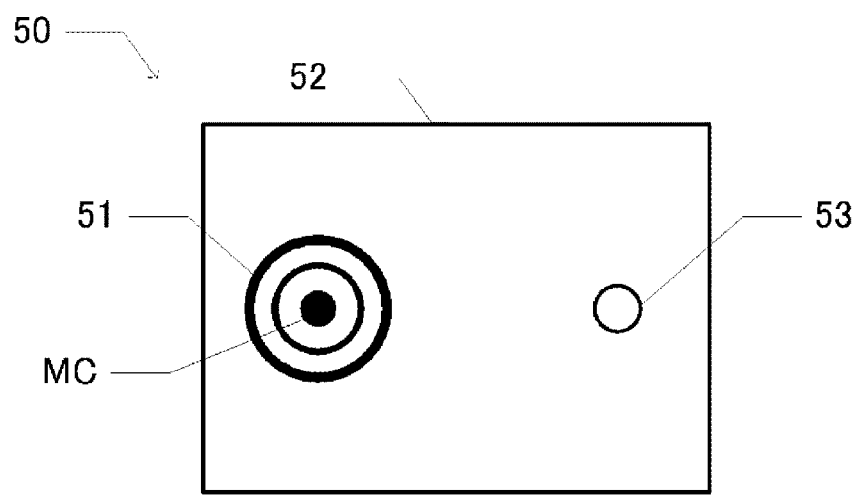
FIG. 17A is a plan view according to the embodiment of the invention.
Figure 17B:
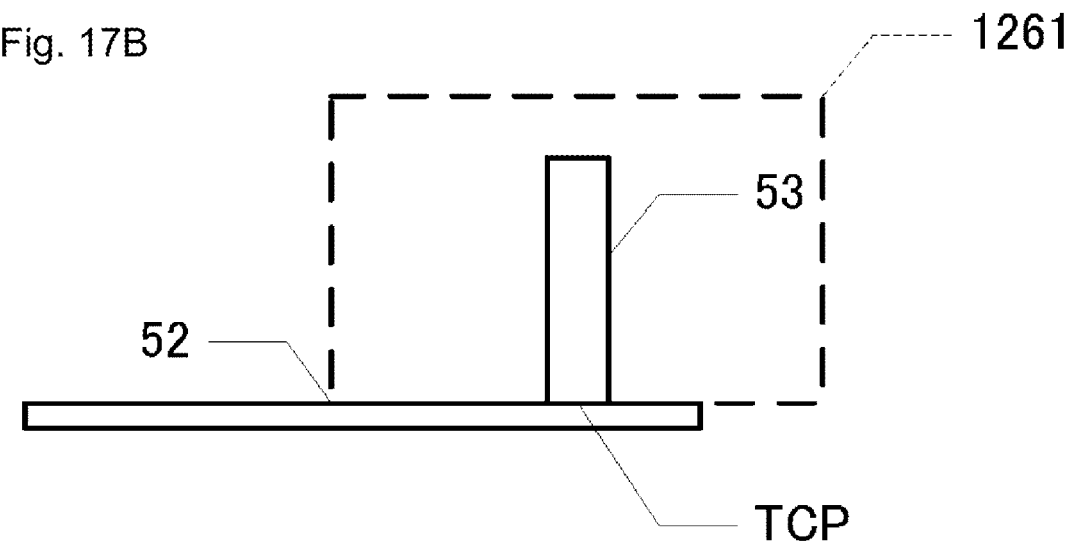
FIG. 17B is a side view according to the embodiment of the invention.

The marker tool 50, as illustrated in FIGS. 17A and 17B, is provided with a flat plate portion 52 and an installation portion 53. The flat plate portion 52 is a flat plate. The installation portion 53 is a column that is disposed perpendicularly to the flat plate portion 52. The installation portion 53 is a part that is inserted into the tool chuck 1261 and fixed to the tool chuck 1261 as illustrated by a broken line in FIG. 17B. When the installation portion is correctly mounted on the tool chuck 1261, the intersection of the center line of the installation portion 53 and the flat plate portion 52 matches the TCP. When the installation portion 53 is mounted on the tool chuck 1261, the marker 51 that indicates a reference point is formed on a face of the flat plate portion 52 that faces the tool chuck 1261 (that is, a face of the flat plate portion 52 on which the installation portion 53 is disposed). The marker 51 is a seal that has a concentric form and is attached to a face of the marker tool 50 that faces the tool chuck 1261. A center MC of the marker 51 is the reference point. The marker 51 may have any form provided that the reference point can be detected from image data that is captured by the capturing unit 2. When the reference point of the tool has a form that can be detected by image recognition, it is not necessary to use the marker that indicates the reference point.

The coordinates of the reference point that is indicated by the marker center MC in a coordinate system that is fixed with respect to the TCP are set as an offset. That is, the coordinates of the reference point of the tool are set as an offset for the tool in a coordinate system that has an origin corresponding to the TCP, one axis parallel to the axis of rotation of the rotary shaft member 126, and two axes orthogonal with respect to the one axis and that rotates along with the rotary shaft member 126. It is easy to insert the columnar installation portion 53 of the marker tool 50 into the tool chuck 1261 by a predetermined depth. Therefore, in the present embodiment, it is assumed that an offset component of the one axis that is parallel to the axis of rotation of the rotary shaft member 126 is set to a predetermined value and that offset components of the other two axes are deduced and set by a below-described tool setting process.

The capturing unit 2 that is fixed in the robot coordinate system can capture the marker 51 that moves in connection with the TCP by using such a marker tool 50. Thus, if the offset for the marker 51 with respect to the TCP can also be specified, the robot coordinate system and the coordinate system of the capturing unit 2 can be automatically calibrated in the same manner as the first embodiment.

Figure 18:
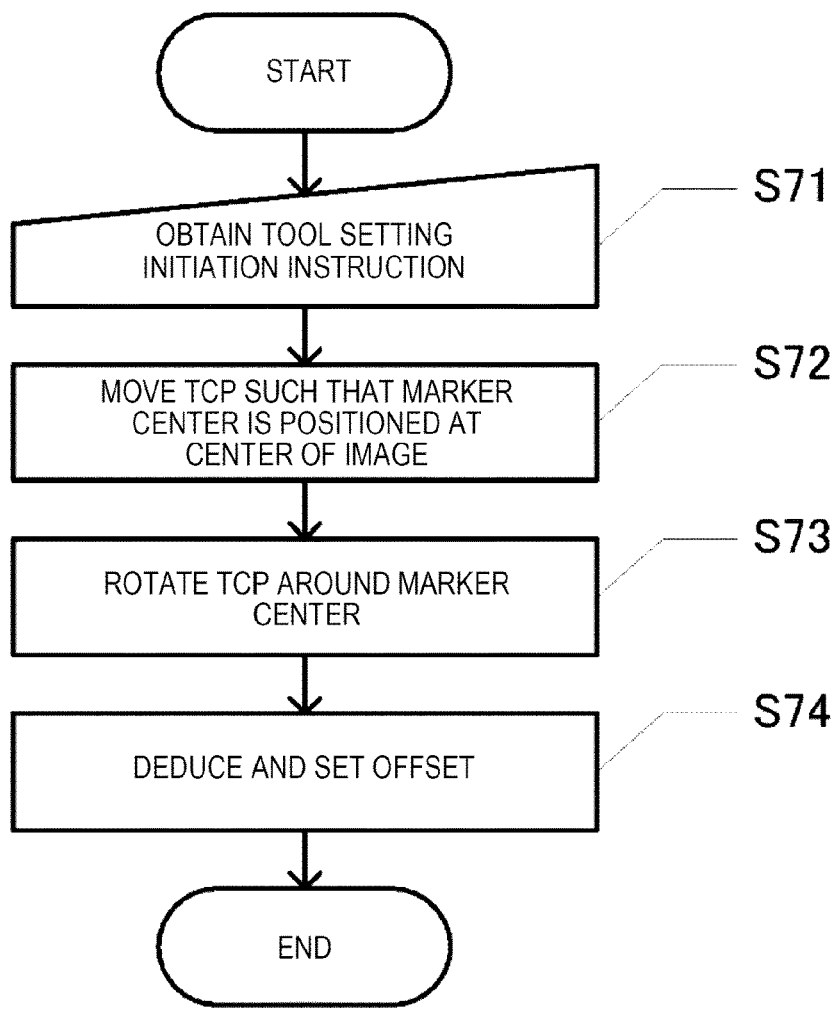
FIG. 18 is a flowchart according to the embodiment of the invention.

Hereinafter, the tool setting process for specifying the position of the marker center MC with respect to the TCP will be described with reference to FIG. 18.

The tool setting process is launched by a tool setting initiation instruction that is input into the PC 3 by the operator. After being launched, the tool setting process is completed without requesting any operation to the operator or with simple operations. Requested to the operator before the input of the tool setting initiation instruction are correctly mounting the installation portion 53 of the marker tool 50 on the tool chuck 1261, moving the TCP with a jog feed operation to a position where the marker 51 can be captured by the capturing unit 2, and setting the offset component for the marker tool 50 with respect to the TCP in the direction of the one axis that is parallel to the axis of rotation of the rotary shaft member 126.

Figure 19A:
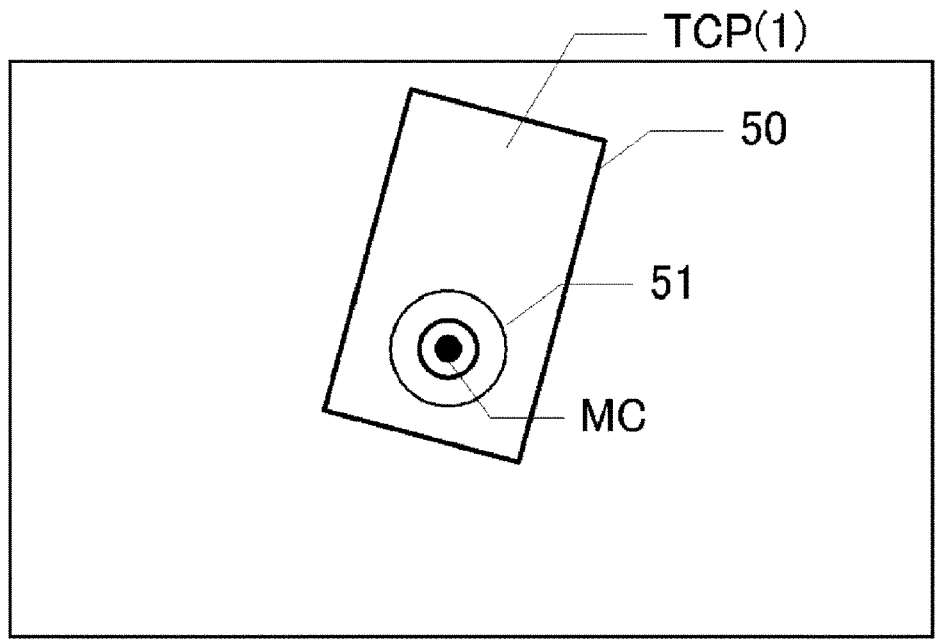
FIG. 19A is a plan view illustrating an image according to the embodiment of the invention.

When the instruction receiving unit 30 obtains the tool setting initiation instruction according to the input thereof by the operator (step S71), the PC 3 moves the TCP such that the marker center MC is positioned at the center of an image that is captured by the capturing unit 2 (step S72). Specific details are as follows. When the tool setting initiation instruction is input, the image obtaining unit 31 instructs the capturing unit 2 to capture an image and obtains image data (1) from the capturing unit 2. Next, the target value deducing unit 32 detects the position of the marker center MC in the coordinate system of the capturing unit 2 from the image data (1) obtained. The template of the marker 51 that is prepared in advance is used in the detection of the marker center MC. Next, the target value deducing unit 32 instructs the capturing unit 2 to capture an image in a state where the TCP is translated in each of the direction of the x axis and the direction of the y axis by a predetermined distance and obtains image data (2) from the capturing unit 2. Next, the target value deducing unit 32 detects the position of the marker center MC in the coordinate system of the capturing unit 2 from the image data (2) obtained. Next, the target value deducing unit 32 deduces a coordinate transformation matrix that transforms the displacement of a target in an image coordinate system into the displacement of the target in the robot coordinate system on the basis of the coordinates of the TCP in the robot coordinate system at the time of the capture of the image data (1), the coordinates of the marker center MC in the coordinate system of the capturing unit 2 detected from the image data (1), the coordinates of the TCP in the robot coordinate system at the time of the capture of the image data (2), and the coordinates of the marker center MC in the coordinate system of the capturing unit 2 detected from the image data (2). Next, the target value deducing unit 32 deduces target values of the TCP for positioning the marker center MC to the center of the image captured by the capturing unit 2 by deducing the displacement from the marker center MC detected from the image data (2) to the center of the image and by transforming the deduced displacement into displacements in the directions of the x axis and the y axis of the robot coordinate system with the coordinate transformation matrix. Next, the output unit 33 moves the arm 11 by outputting the deduced target values to the control unit 14. In consequence, the TCP is translated in each of the direction of the x axis and the direction of the y axis, and the positional relationship between the capturing unit 2, the TCP, and the marker center MC becomes a first state. Thus, the marker center MC is positioned at the center of the image that is captured by the capturing unit 2 as illustrated in FIG. 19A. The center of the image captured by the capturing unit 2 is the reference point that associates the image coordinate system with the robot coordinate system. The marker center MC is a point that corresponds to the reference point in the workspace when the marker center MC is positioned at the center of the image.

Figure 19B:
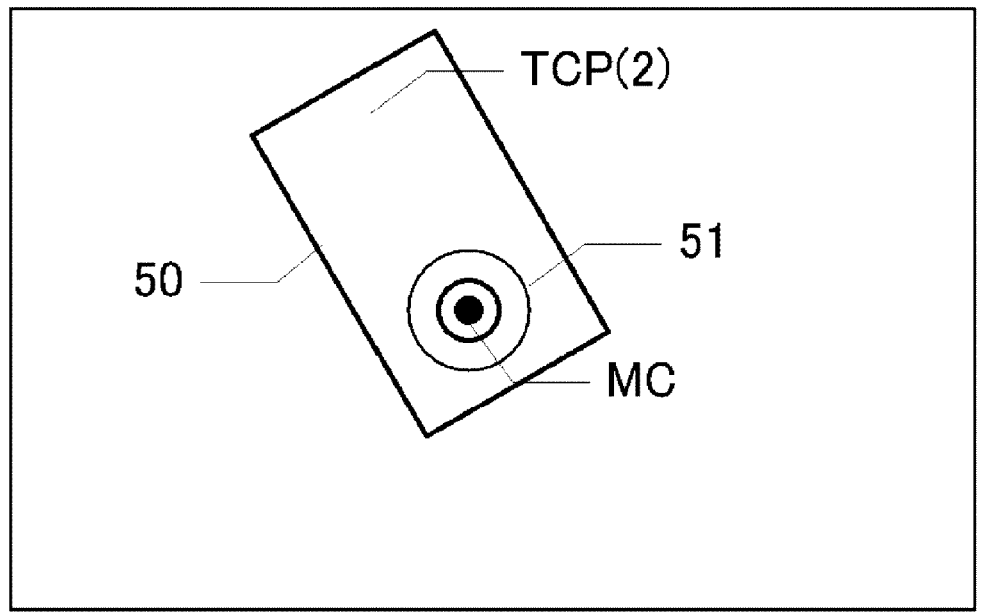
FIG. 19B is a plan view illustrating an image according to the embodiment of the invention.
Figure 19C:
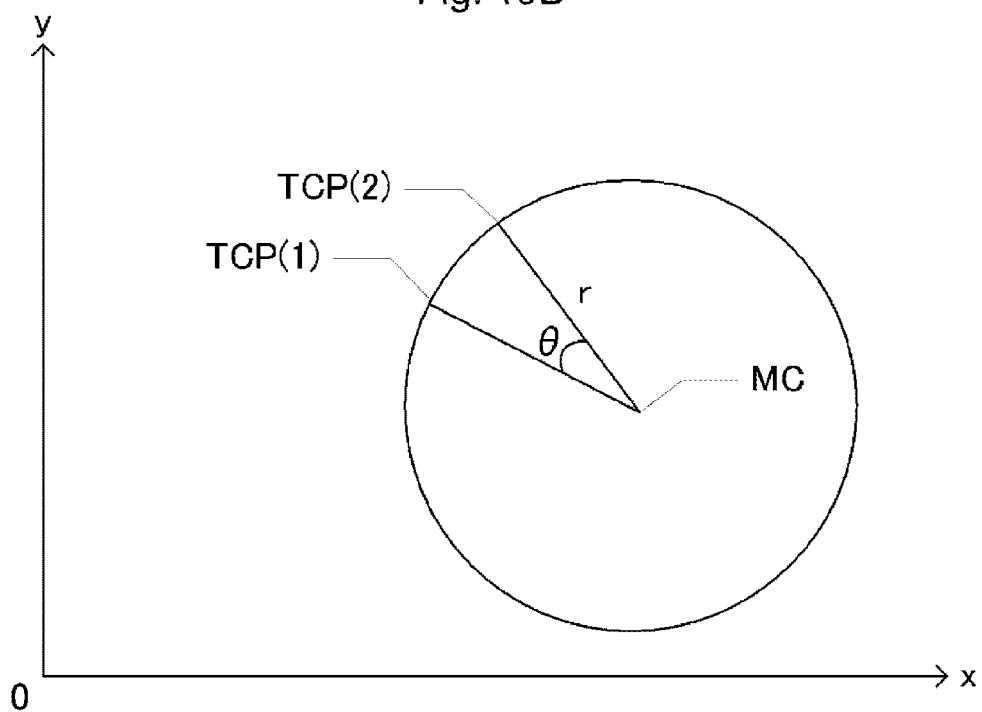
FIG. 19C is a coordinate diagram according to the embodiment of the invention.

When the marker center MC is positioned at the center of the image captured by the capturing unit 2, the PC 3 changes the attitude of the arm 11 such that the TCP rotates around the center of the image in the image coordinate system (step S73). Specific details are as follows. The target value deducing unit 32 deduces the x coordinate and the y coordinate of the marker center MC in the robot coordinate system by using the coordinate transformation matrix deduced in step S72. Since the marker center MC is positioned at the center of the image, the x coordinate and the y coordinate of the marker center MC in the robot coordinate system are deduced by transforming the coordinates of the center of the image into coordinates in the robot coordinate system with the coordinate transformation matrix. Next, the target value deducing unit 32 deduces target values for rotating the TCP around the marker center MC by a predetermined angle on the xy plane. Next, the output unit 33 moves the arm 11 by outputting the deduced target values to the control unit 14. Specifically, for example, when the axis of rotation of the rotary shaft member 124 is maintained parallel to the z axis at all times during the tool setting process, the TCP may be translated in a direction perpendicular to the z axis by rotating the rotary shaft members 121, 122, 123, 125, and 126 after rotating the rotary shaft member 124 by a predetermined angle (for example, 30 degrees). In consequence, as illustrated in FIG. 19C, the TCP rotates around the marker center MC by a predetermined angle, and the positional relationship between the capturing unit 2, the TCP, and the marker center MC transitions from the first state to a second state. During the transition, the TCP rotates around the center of the image in the image coordinate system as illustrated in FIG. 19A to FIG. 19B. The angle of the rotation may be determined in advance within a range in which the marker tool 50 mounted on the tool chuck 1261 which has a position and attitude changed after the rotation can be captured by the capturing unit 2.

The center of the image corresponds to the optical axis of the lens 201. Thus, the distortion of the lens 201 is small in comparison with a location that is separated from the center of the image. Therefore, even when the robot coordinate system and the image coordinate system are not accurately calibrated as in the present embodiment, the relationship between the center of the image and the reference point that is the center of rotation of the TCP in the image coordinate system is less distorted. However, since it is sufficient in the present embodiment that the TCP can rotate around the reference point, even when the relationship between the reference point and a specific point on the image is distorted, problems do not arise as long as the specific point is not moved. Therefore, the point that corresponds to the reference point around which the TCP rotates may not be the center of the image.

When the TCP rotates around the center of the image in the image coordinate system, the PC 3 deduces and sets the offset for the marker center MC with respect to the TCP on the basis of the position of the TCP after the step S72 is performed and the position of the TCP in step S73 (step S74). Here, the first state and the second state in the robot coordinate system will be described with reference to FIG. 19C. During the transition from the first state to the second state, the TCP rotates around the marker center MC without moving in the z direction. During this, the TCP draws an arc trajectory around the marker center MC. The radius of the arc is equal to the distance from the TCP to the marker center MC, and the central angle of the arc is equal to the angle by which the TCP rotates from the first state to the second state. Therefore, the calibrating unit 34 solves simultaneous equations by representing the x and y coordinates of the TCP in the first state and in the second state with the x and y coordinates of the marker center MC, a central angle q of the arc, and a radius r of the arc and deduces the x coordinate and the y coordinate of the marker center MC in the robot coordinate system. The x coordinate and the y coordinate of the TCP in the first state and in the second state are known, and the correspondence between the robot coordinate system and the coordinate system that is fixed to the rotary shaft member 126 (coordinate system that is fixed to the TCP) is also known. Therefore, the calibrating unit 34 deduces and sets the offset components for the marker tool 50 with respect to the TCP in the directions of the two axes perpendicular to the axis of rotation of the rotary shaft member 126 on the basis of the x coordinate and the y coordinate of the TCP in one of the first state and the second state and the x coordinate and the y coordinate of the marker center MC.

Figure 20A:
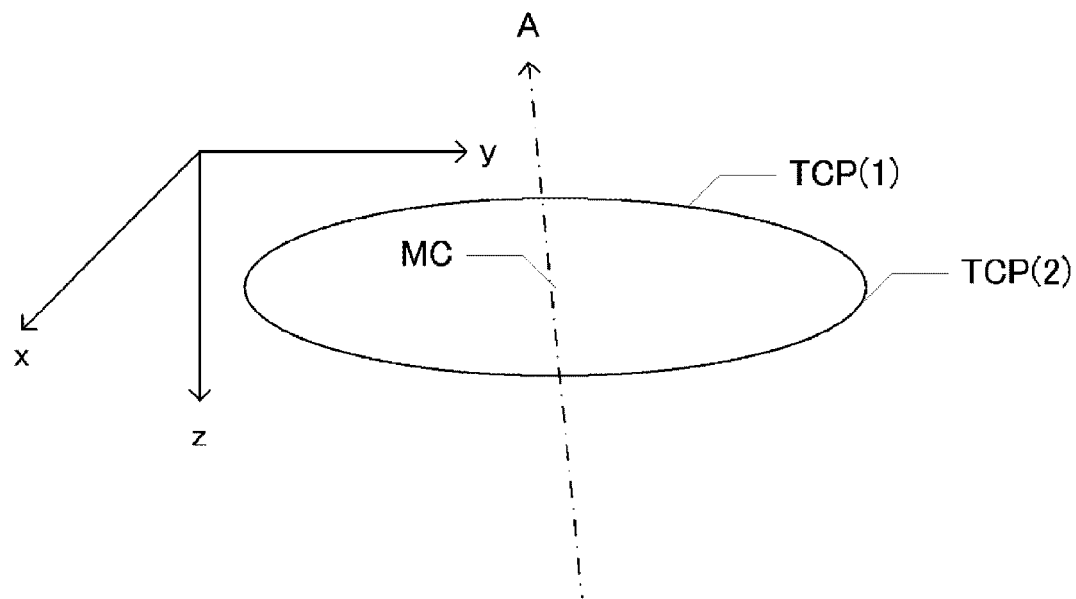
FIG. 20A is a descriptive diagram according to the embodiment of the invention.
Figure 20B:
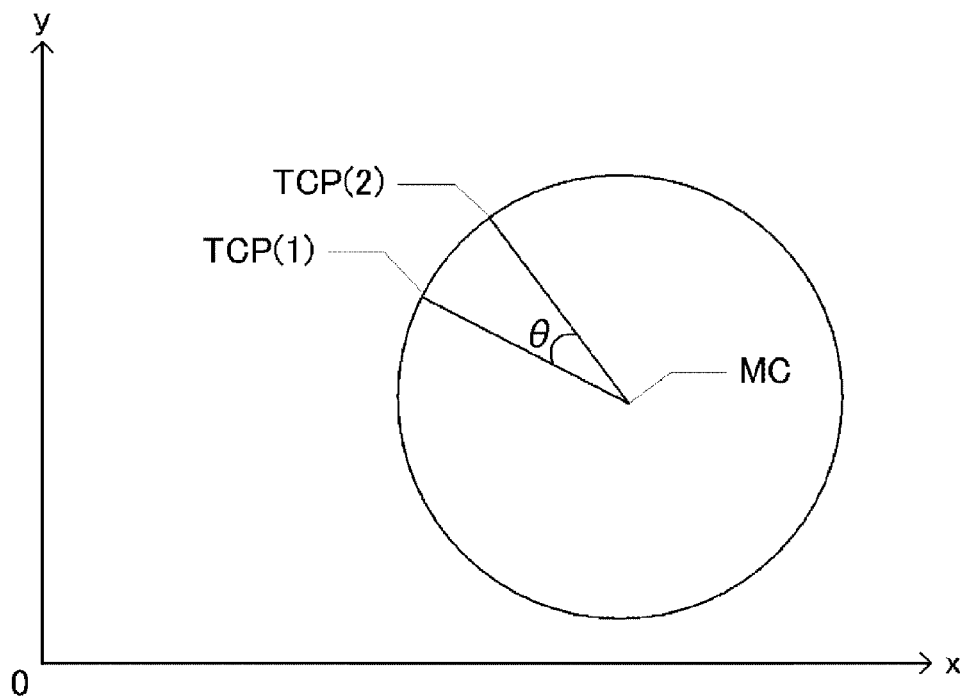
FIG. 20B is a coordinate diagram according to the embodiment of the invention.

While the present embodiment has the assumption that a capture direction A of the capturing unit 2 is parallel to the z axis of the robot coordinate system, even when the capture direction A of the capturing unit 2 is not parallel to the z axis of the robot coordinate system as illustrated in FIG. 20A, the offset for the marker tool 50 can be deduced without problem. The reason is that the TCP rotates around an axis parallel to the z axis, not around an axis parallel to the capture direction A, from the first state to the second state, and the offset can be deduced by solving equations in the robot coordinate system without using the coordinates of the TCP in the image when the offset is deduced in step S74. That is, even when the capture direction A of the capturing unit 2 is not parallel to the z axis of the robot coordinate system as illustrated in FIG. 20A, the relationship between the TCP and the marker center MC in the robot coordinate system is the same as in a case where the capture direction A of the capturing unit 2 is parallel to the z axis of the robot coordinate system as illustrated in FIG. 20B.

In the tool setting process described thus far, the offset for the marker tool 50 with respect to the TCP in the two remaining axes except for the one axis parallel to the axis of rotation of the rotary shaft member 126 can be automatically deduced and set by just moving the TCP to a position where a marker M can be captured by the capturing unit 2 with a jog feed operation. Therefore, the offsets can be easily set in a short time. When the tool setting process ends, the coordinate system of the capturing unit 2 and the robot coordinate system can be automatically calibrated in the same manner as the first embodiment. According to the present embodiment, even when the capturing unit 2 is disposed in a position and attitude where the capturing unit 2 cannot capture the tool chuck 1261 on which the tool is mounted, the coordinate system of the capturing unit 2 and the robot coordinate system can be automatically calibrated because the marker 51 is formed on the face of the marker tool 50 that faces the tool chuck 1261.

In the present embodiment, the intersection of the center line of the installation portion 53 and the flat plate portion 52 matches the TCP when the installation portion 53 is correctly mounted on the tool chuck 1261, and the face on which the marker 51 is formed is flat. Thus, the marker 51 is positioned on a plane that is perpendicular to the axis of rotation of the rotary shaft member 126 and that includes the TCP when the installation portion 53 is correctly mounted on the tool chuck 1261. However, the marker 51 may not be positioned on the plane that is perpendicular to the axis of rotation of the rotary shaft member 126 and that includes the TCP.

7. Other Embodiments

It is apparent that the technical scope of the invention is not limited to the above embodiments and that various modifications can be added to the invention to an extent without departing from the gist of the invention.

For example, the calibration initiation instruction may be received by a click operation with a mouse, a tap operation on a display, or voice.

The order of the low-accuracy inclination correction, the focal point adjustment, and the high-accuracy inclination correction described in the above embodiments may be changed. The focal point adjustment may be performed before the low-accuracy inclination correction, or any of the low-accuracy inclination correction, the focal point adjustment, and the high-accuracy inclination correction may not be performed. In addition, there may be at least one process that obtains target values deduced on the basis of an image in which the marker is captured by the capturing unit when calibration is not performed and that changes the positional relationship between the capturing unit and the reference point to a predetermined state on the basis of the target values. For example, a robot operation for focusing the capturing unit on the reference point may be performed by a jog feed, and only the high-accuracy inclination correction may be performed on the basis of the target values that are deduced on the basis of the image.

The robot coordinate system and the coordinate system of the capturing unit may be calibrated on the basis of the coordinates of three or more reference points that are obtained at the time of the high-accuracy inclination correction without performing the nine-point calibration. That is, the coordinate system of the capturing unit and the robot coordinate system may be calibrated by using three or more reference points that are set by the high-accuracy inclination correction on the reference plane, may be calibrated by using eight or less reference points, or may be calibrated by using 10 or more reference points.

Target values for changing the robot to a predetermined attitude may be included in the calibration initiation instruction. For example, when the position at which the capturing unit or the marker board is fixed on the table is determined in advance, target values for moving the robot to a position where the reference plane approximately faces the capturing unit without using the robot vision may be included in the calibration initiation instruction.

The invention can be applied to a vertical articulated robot in addition to a six-axis robot and can be applied to a scalar robot in which all the axes of rotation of arms are parallel. The invention can be applied to three-dimensional robot vision that uses two or more capturing units. That is, when the invention is applied to the calibration of the robot coordinate system and the coordinate systems of a plurality of capturing units that is used to implement three-dimensional robot vision, the positional relationship between each capturing unit and the marker can be changed by the calibration initiation instruction to a state where an image necessary for calibrating the coordinate systems of the capturing units and the robot coordinate system can be captured.

The invention claimed is:

1. A robot comprising:
   a body:
   an arm that is attached to the body, the arm configured to move with respect to the body;
   an image sensor configured to capture an image including a marker indicating a reference point;
   a storage configured to store a program; and
   a processor configured to execute the program so as to:
      move the arm to a predetermined position in which a locational relationship between the image sensor and the marker is defined as a predetermined state;
      capture an image of the maker by the imaging sensor when the locational relationship between the image sensor and the maker is in the predetermined state;
      perform a calibration of a coordinate system of the image sensor and a coordinate system of the robot based on the captured image;
      create a partial image which is clipped out of the image;
      obtain a target value with respect to the arm based on the partial image when the locational relationship between the image sensor and the maker is in the predetermined state; and
      move the arm to another position that is different from the predetermined position based on the target value so as to make the image sensor to focus on the maker.

2. The robot according to claim 1,
   wherein the processor is configured to execute a calibration initiation instruction so as to perform the calibration, and
   the calibration initiation instruction does not include the target value that is used to move the arm to another position.

3. The robot according to claim 1,
   wherein the processor is configured to move the arm so as to cause the image sensor to focus on the marker by changing the locational relationship between the image sensor and the marker along a perpendicular line to a plane which includes three or more of the reference points from a first position to a second position and then by changing the locational relationship between the image sensor and the marker along the perpendicular line from the second position to a third position, and
   a direction from the first position to the second position is opposite to a direction from the second position to the third position.

4. The robot according to claim 1,
   wherein the predetermined position includes a state where a plane that includes three or more of the reference points is perpendicular to an optical axis of the image sensor.

5. The robot according to claim 4,
   wherein the predetermined position includes three or more states that have different positions at which the optical axis of the image sensor passes through the plane.

6. The robot according to claim 1,
   wherein the image sensor is disposed in the arm.

7. The robot according to claim 1,
   wherein the marker is disposed in the arm.

8. The robot according to claim 2,
   wherein the image sensor is disposed in the arm.

9. The robot according to claim 2,
   wherein the marker is disposed in the arm.

10. The robot according to claim 3,
    wherein the image sensor is disposed in the arm.

11. The robot according to claim 3,
    wherein the marker is disposed in the arm.

12. A robot comprising:
    an arm that automatically changes a positional relationship between a marker which indicates three or more reference points and an image sensor to at least one of
    a first state where a plane which includes the three or more reference points is perpendicular to an optical axis of the image sensor,
    a second state where the image sensor focuses on the marker which indicates at least one of the three or more reference points,
    a third state where the optical axis of the image sensor passes through a first point on the plane,
    a fourth state where the optical axis of the image sensor passes through a second point on the plane, and
    a fifth state where the optical axis of the image sensor passes through a third point on the plane,
    wherein the calibration of a coordinate system of the image sensor and a coordinate system of the robot is performed on the basis of an image in which the marker is captured by the image sensor in the third state, the fourth state, and the fifth state.

13. The robot according to claim 12,
    wherein the arm automatically changes the positional relationship to the first state, the second state, the third state, the fourth state, and the fifth state.

14. The robot according to claim 12,
wherein the arm obtains a target value that is deduced on the basis of an image in which the marker is captured by the image sensor and automatically changes the positional relationship on the basis of the target value.

15. The robot according to claim 13,
wherein the arm obtains a target value that is deduced on the basis of an image in which the marker is captured by the image sensor and automatically changes the positional relationship on the basis of the target value.

* * * * *